Aug. 20, 1946.   S. P. PARKER   2,405,975
LOOM
Filed July 27, 1945   19 Sheets-Sheet 1

INVENTOR
SAMUEL P. PARKER
BY
ATTORNEYS

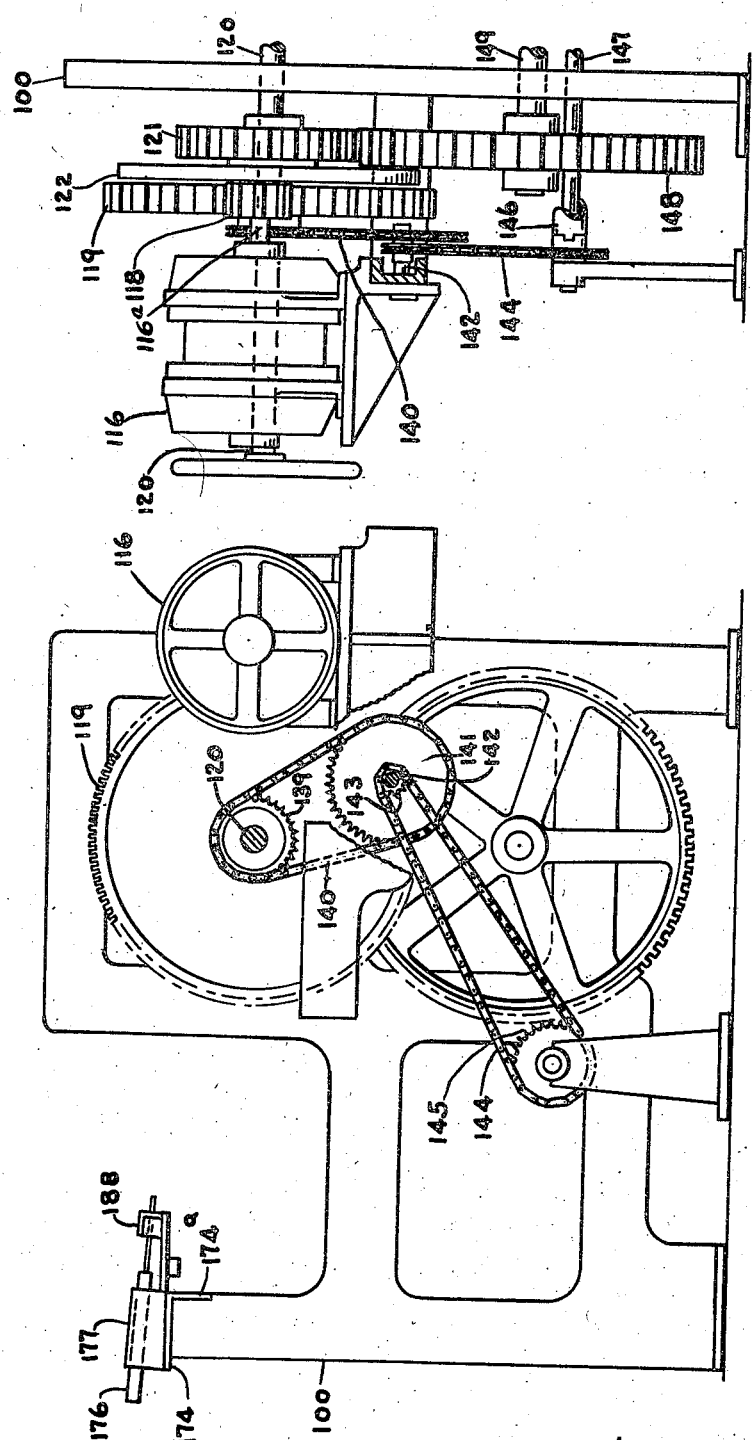

Aug. 20, 1946.　　　S. P. PARKER　　　2,405,975
LOOM
Filed July 27, 1945　　　19 Sheets-Sheet 4

INVENTOR
SAMUEL P. PARKER
BY
ATTORNEYS

Aug. 20, 1946.  S. P. PARKER  2,405,975
LOOM
Filed July 27, 1945  19 Sheets-Sheet 5

INVENTOR
SAMUEL P. PARKER
BY:
ATTORNEYS

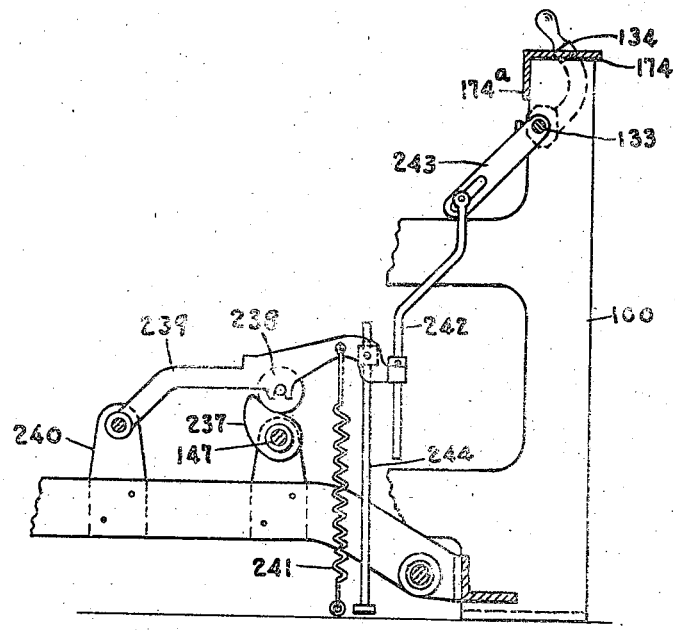
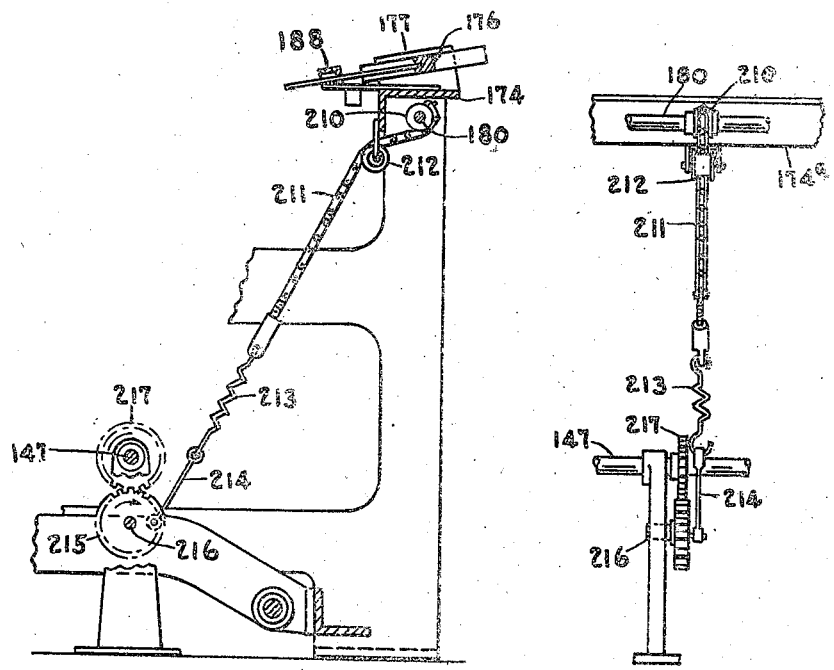
Fig. 9
Fig. 10
Fig. 11

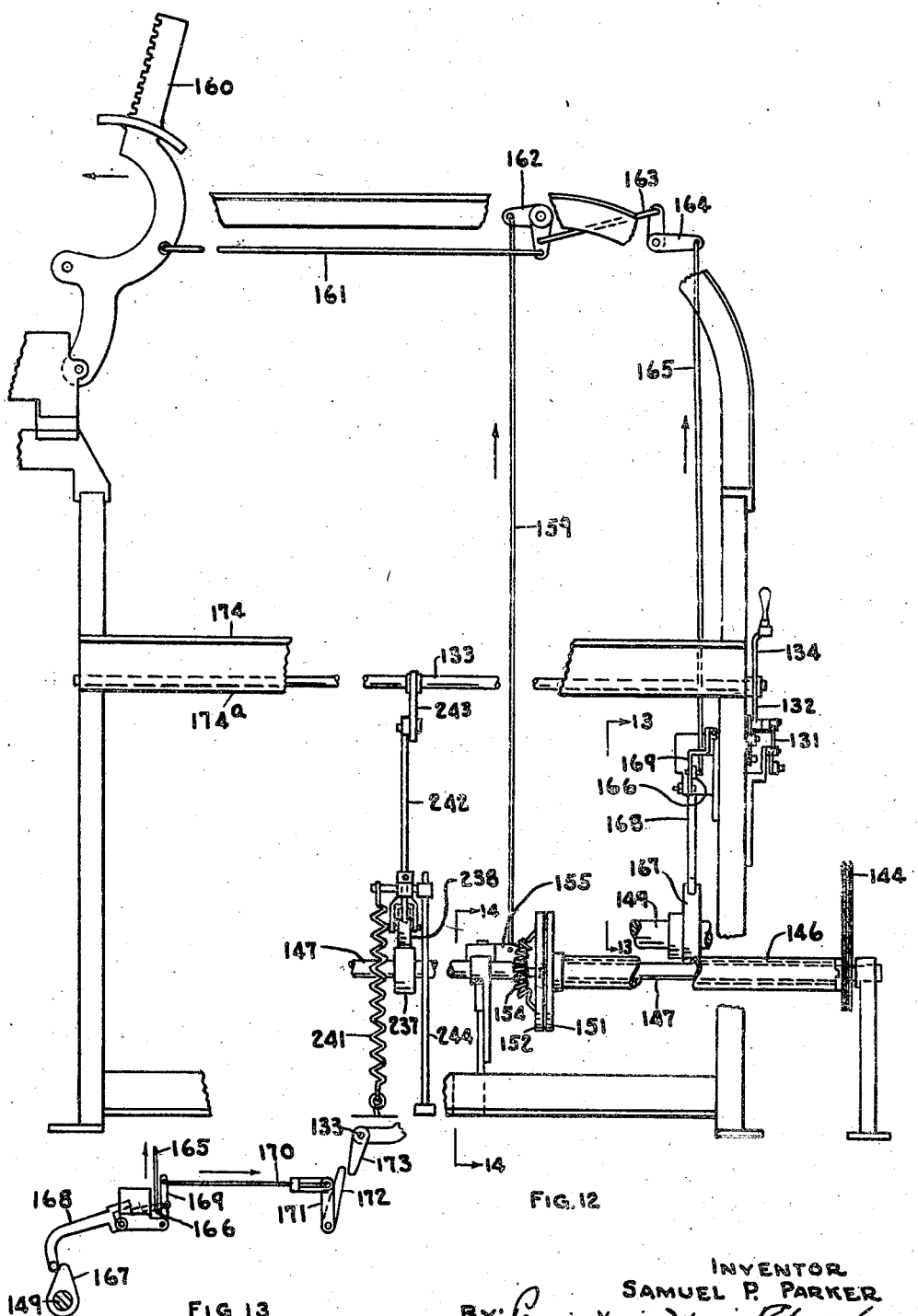

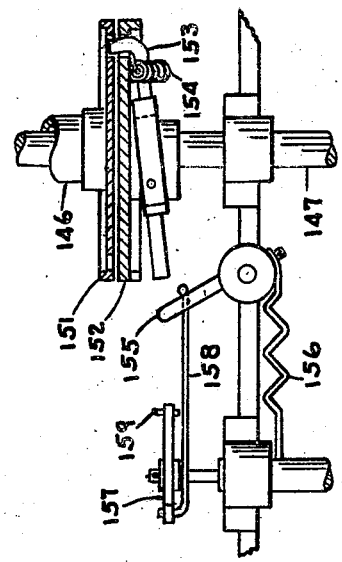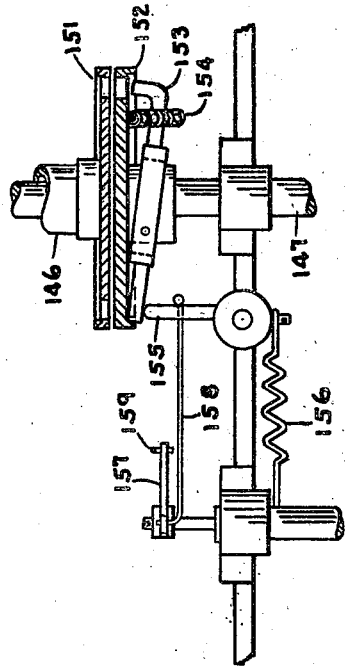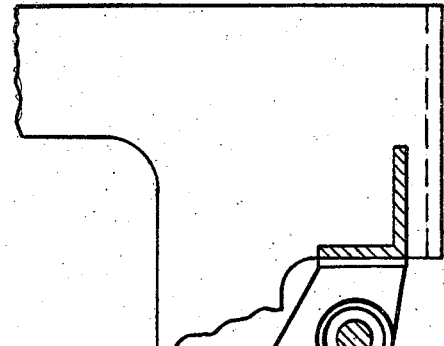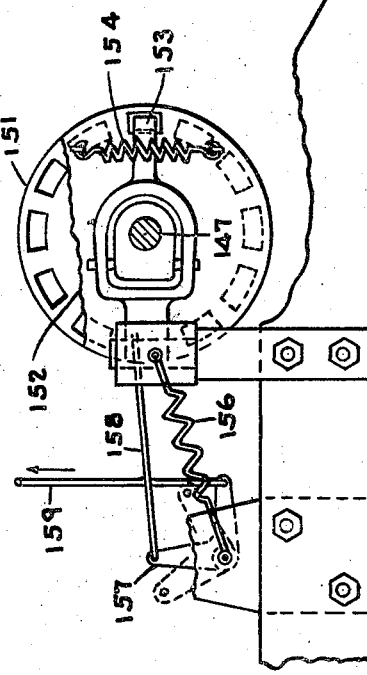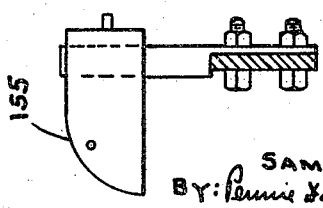

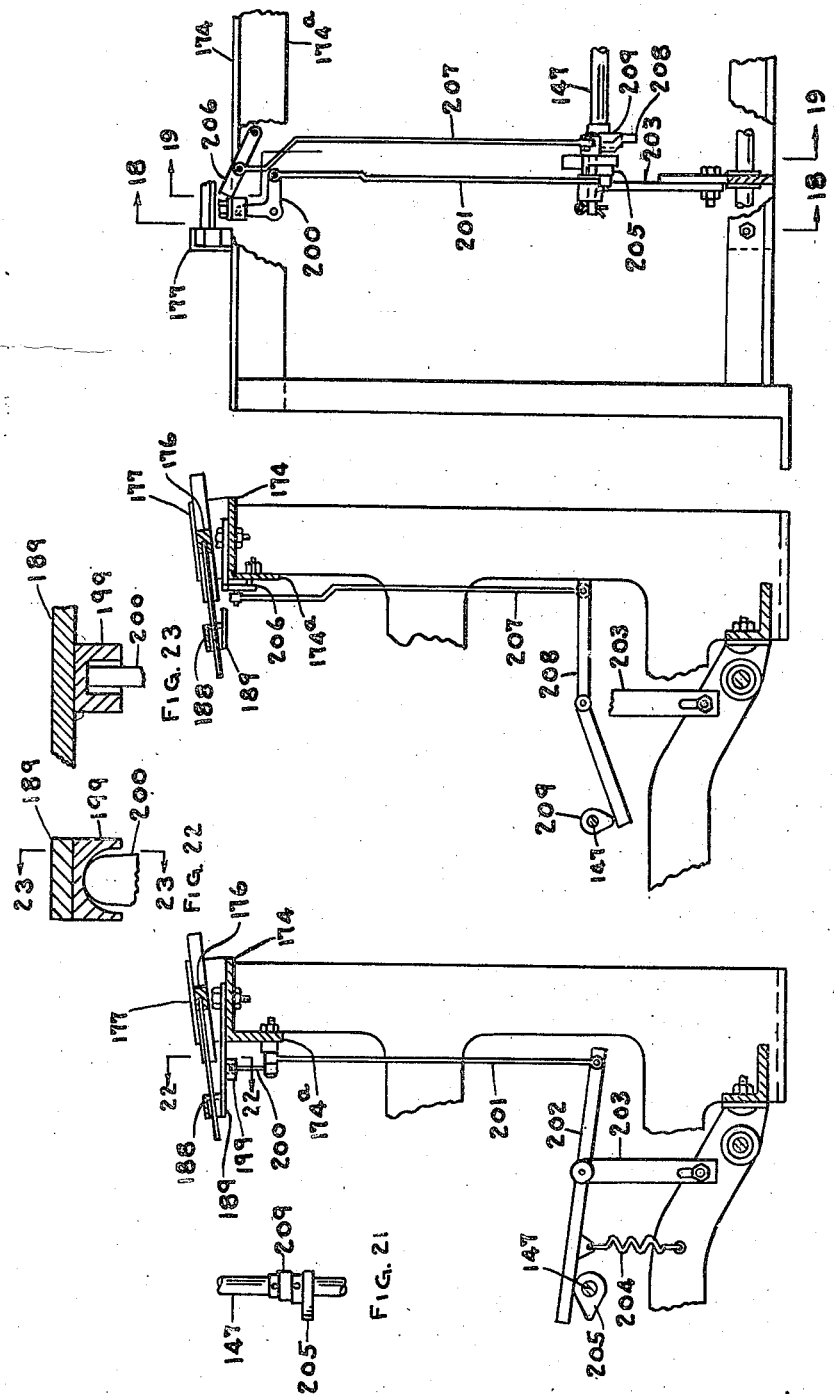

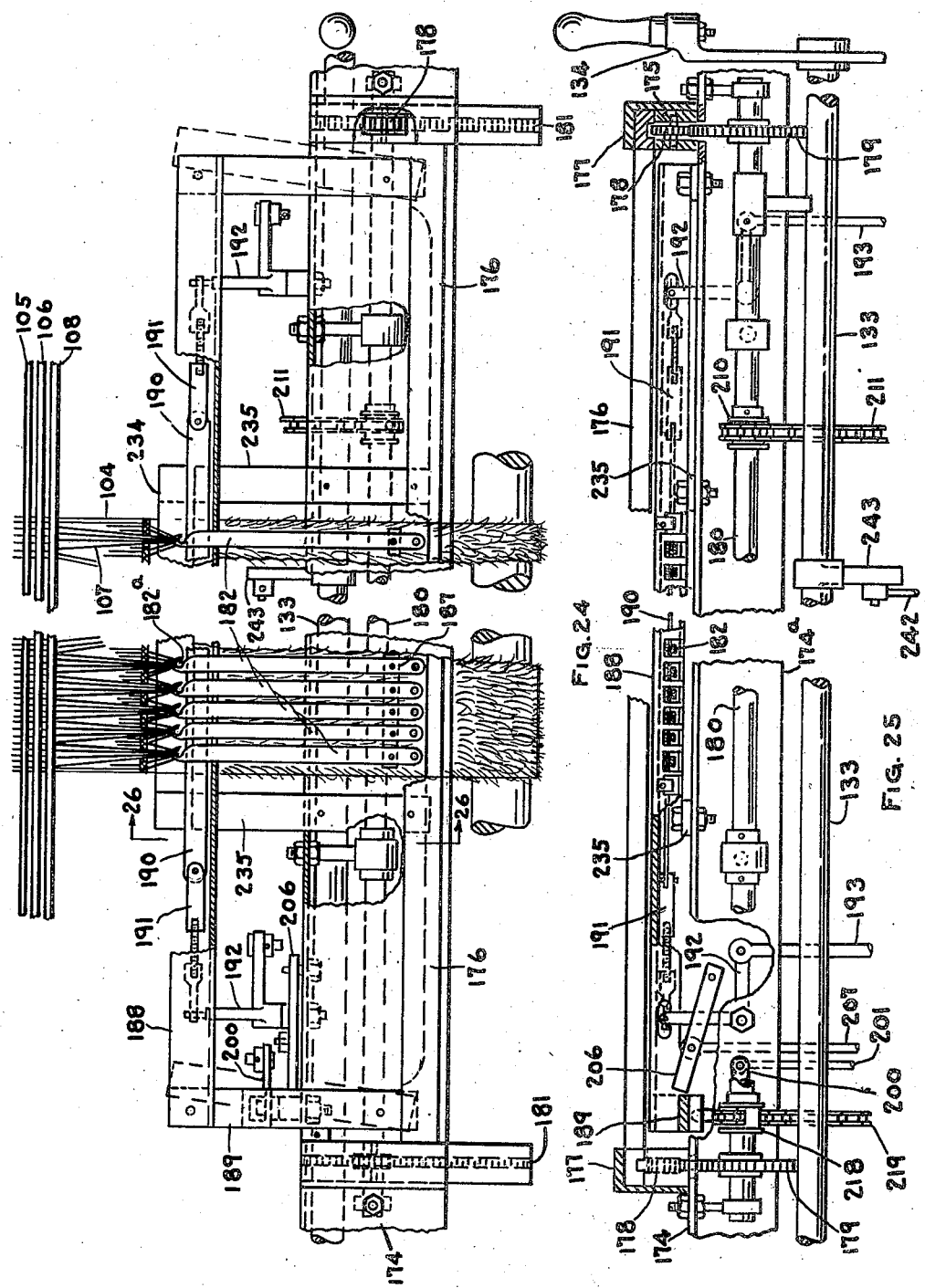

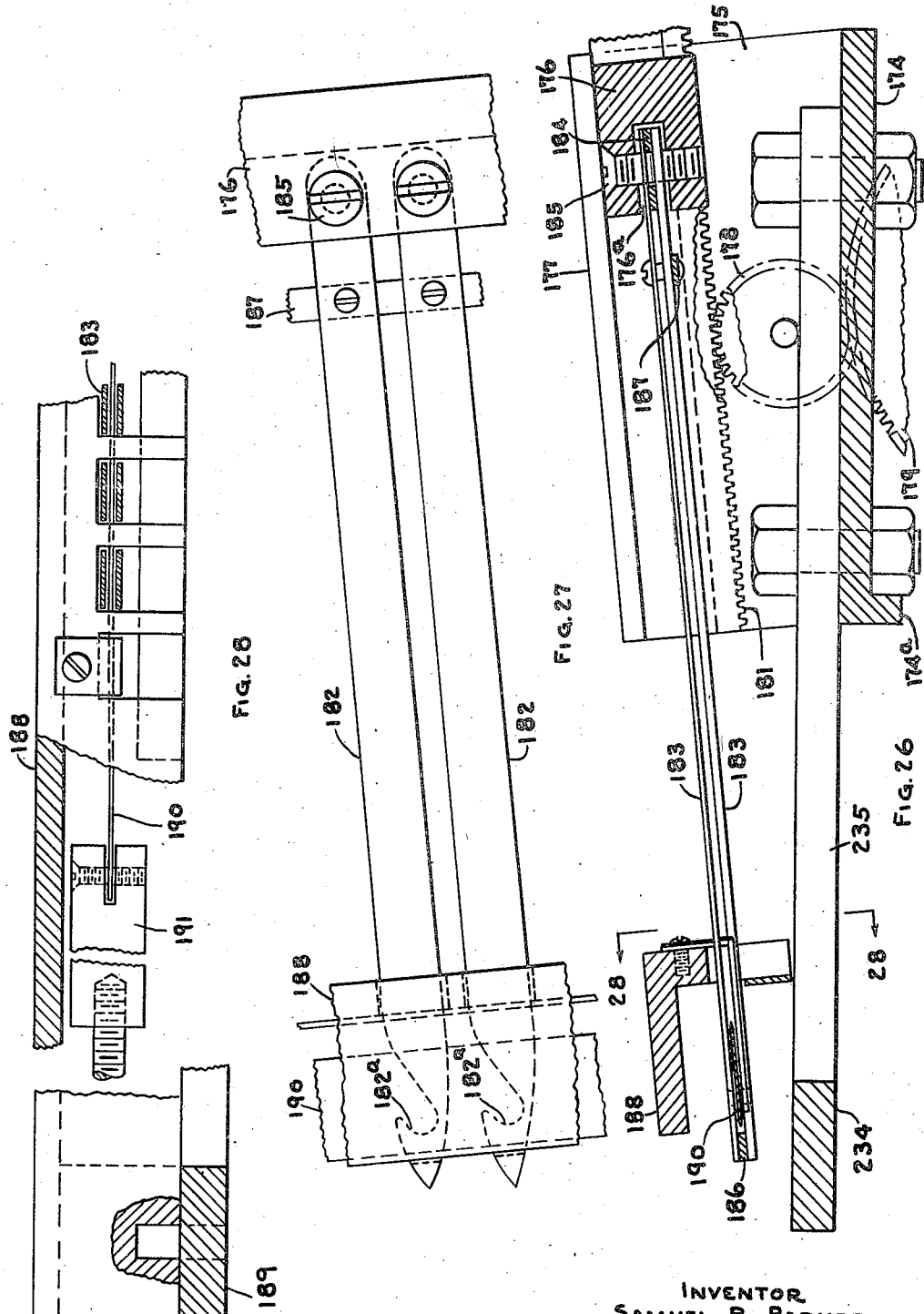

Aug. 20, 1946.  S. P. PARKER  2,405,975
LOOM
Filed July 27, 1945  19 Sheets-Sheet 12
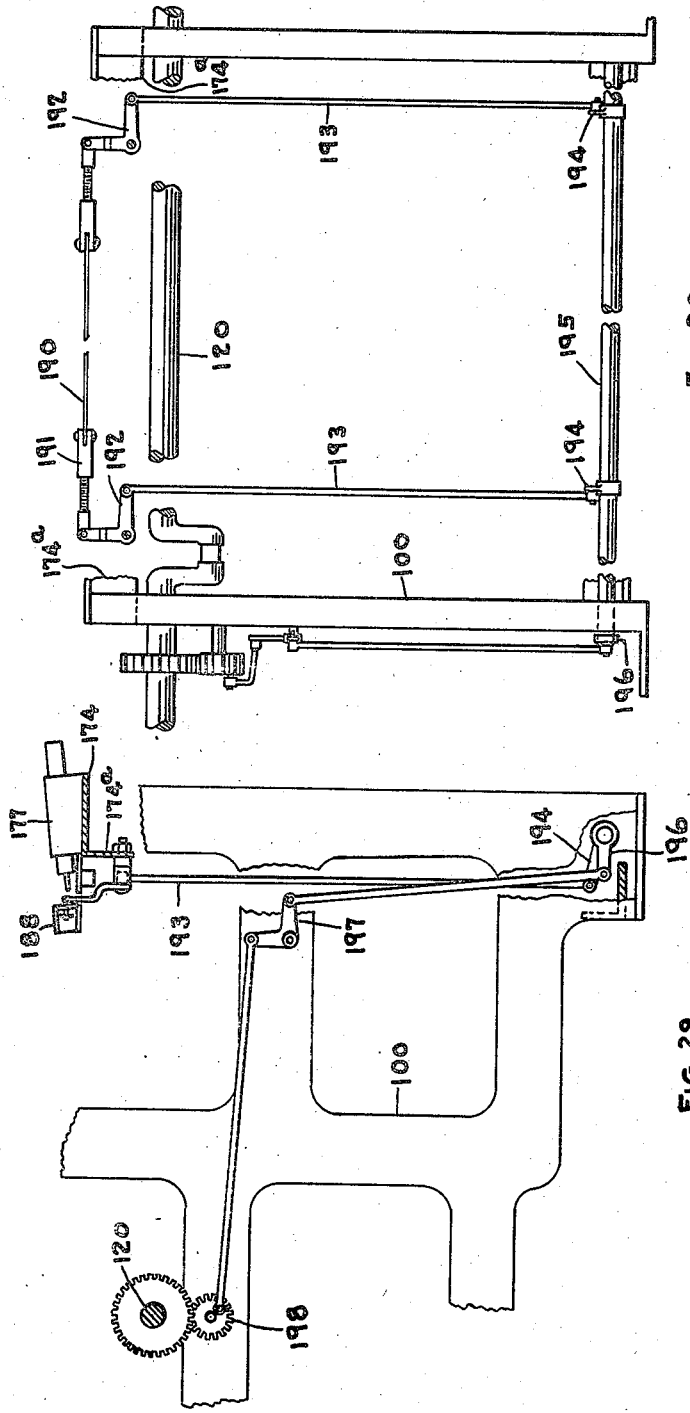
INVENTOR
SAMUEL P. PARKER
BY: *Pennie Davis Marvin Edmonds*
ATTORNEYS Aug. 20, 1946.  S. P. PARKER  2,405,975
LOOM
Filed July 27, 1945  19 Sheets-Sheet 13

INVENTOR
SAMUEL P. PARKER
BY: *Pennie Davis Marvin Edmonds*
ATTORNEYS

Aug. 20, 1946.   S. P. PARKER   2,405,975
LOOM
Filed July 27, 1945   19 Sheets-Sheet 14

INVENTOR
SAMUEL P. PARKER
BY: Pennie Davis Marvin Edmonds
ATTORNEYS

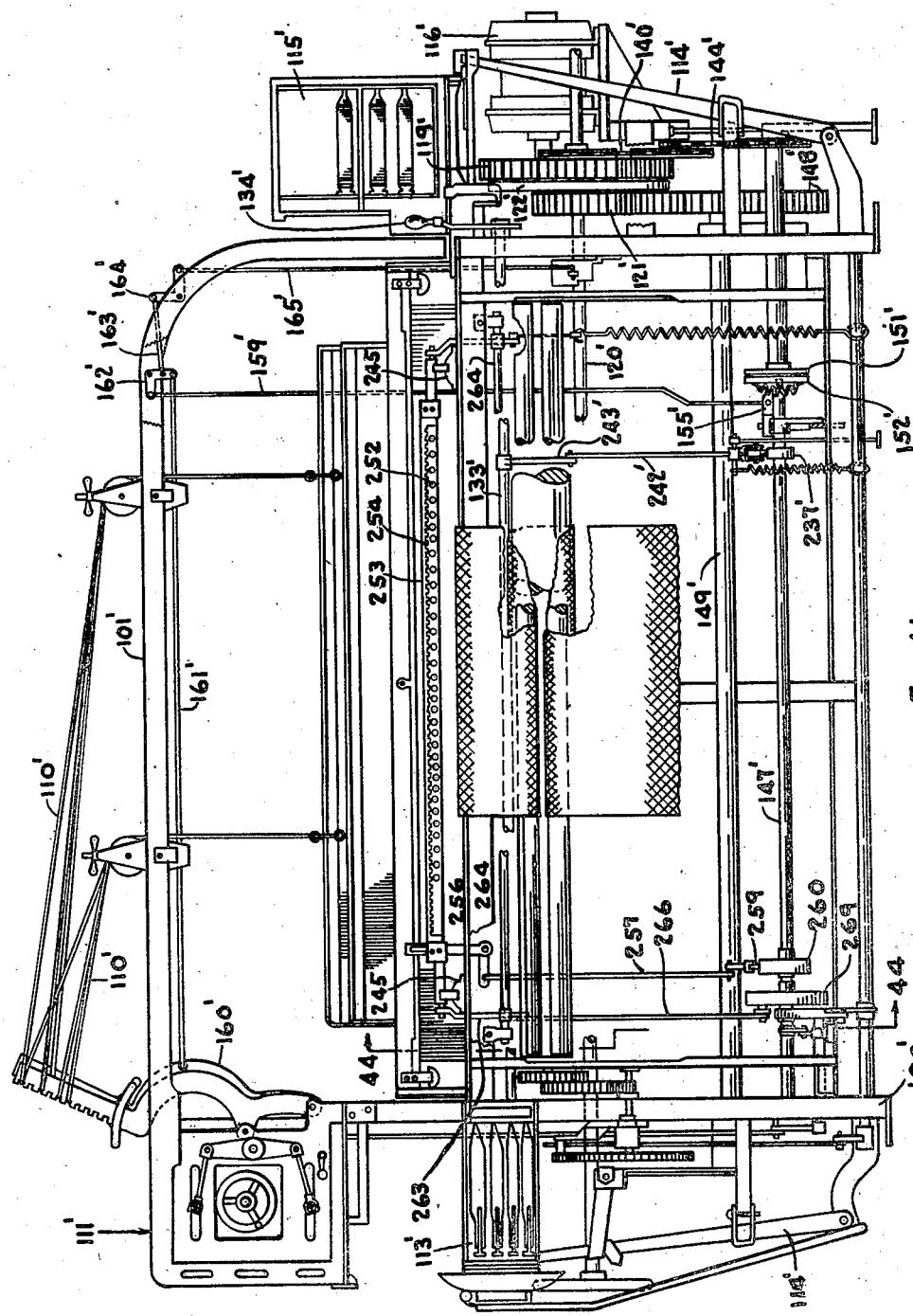

Aug. 20, 1946.   S. P. PARKER   2,405,975
LOOM
Filed July 27, 1945   19 Sheets-Sheet 16

INVENTOR
SAMUEL P. PARKER
ATTORNEYS

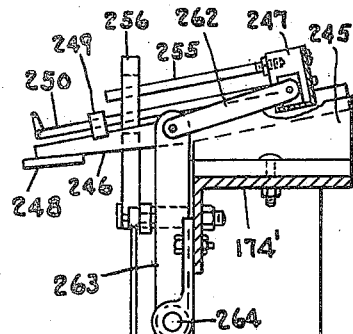
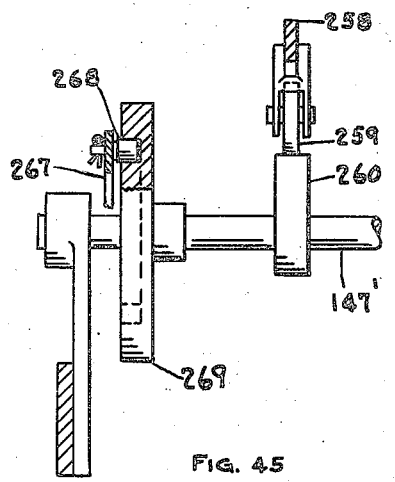
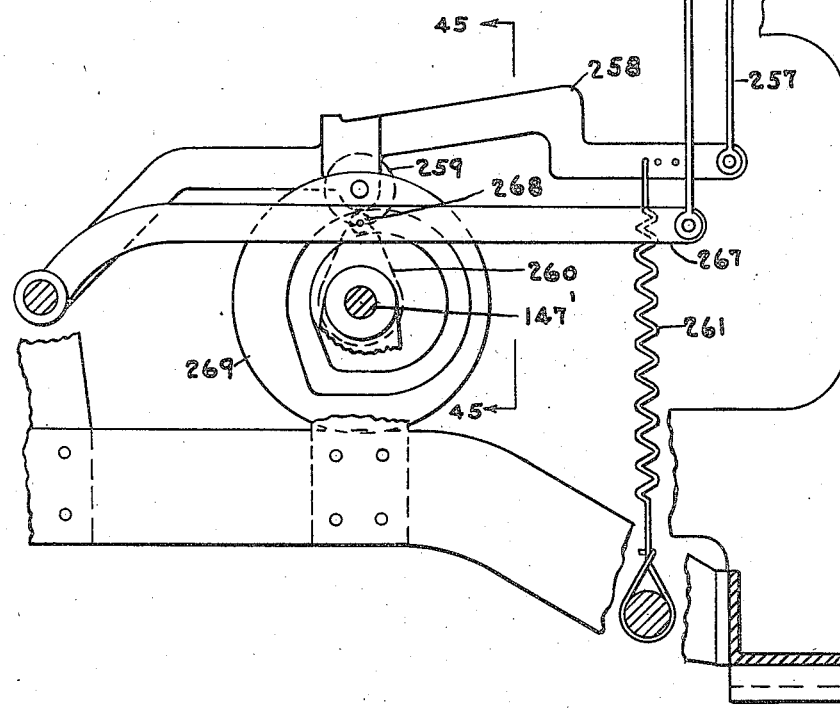
Fig. 45
Fig. 44

Aug. 20, 1946.    S. P. PARKER    2,405,975
LOOM
Filed July 27, 1945    19 Sheets-Sheet 18

INVENTOR
SAMUEL P. PARKER
BY: *Pennie Davis Marvin Edmonds*
ATTORNEYS

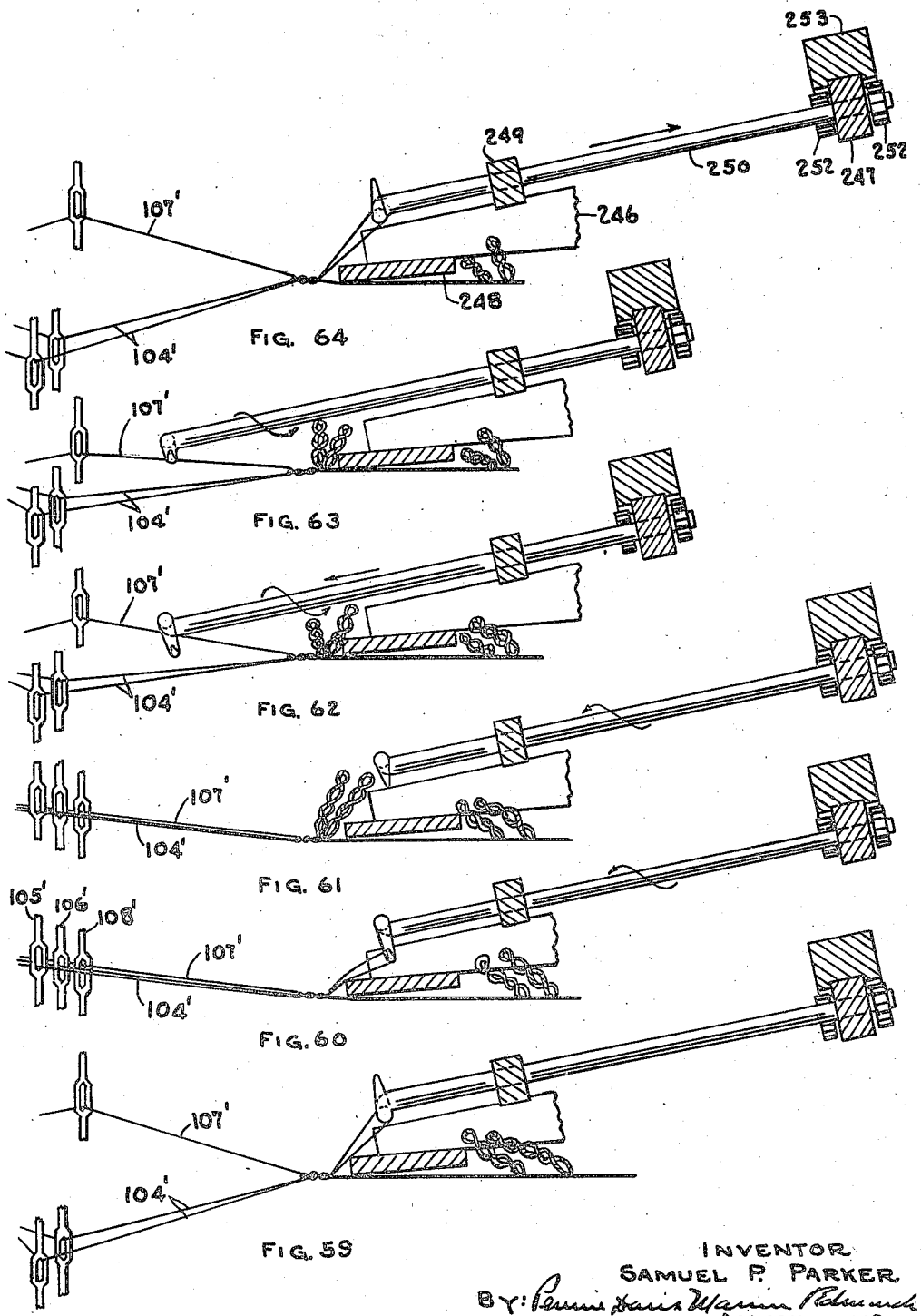

Patented Aug. 20, 1946

2,405,975

UNITED STATES PATENT OFFICE 2,405,975

LOOM

Samuel P. Parker, La Grange, Ga., assignor to Callaway Mills, La Grange, Ga., a corporation of Georgia Application July 27, 1945, Serial No. 607,421

31 Claims. (Cl. 139—38)

This invention relates to pile fabric looms of the type in which means are provided for periodically drawing out pile yarns from the shed to form loops, which are then bound in place as the weaving continues and may be cut or left uncut, as desired. Such looms are employed to especial advantage in the weaving of fabrics having a long pile which cannot be readily made by the use of wires. More particularly, the invention is concerned with a novel loom of the construction referred to, which is superior to prior similar looms in that it is simpler in construction and more reliable in operation. The new loom may be built to produce fabrics of different widths and operated to weave fabrics of varying constructions and different lengths of pile in the form of either cut or uncut loops. Also, the pile forming mechanism of the new loom may be readily installed on existing looms, so that equipment available in a mill and used for weaving ordinary goods may be converted to pile fabric production and changed back, as the demands of the market may require.

The loom of the invention includes the usual weaving means, including means for supplying ground and pile warp yarns, means for forming the warp yarns into sheds, means for inserting picks of filling in the sheds, beat-up means, and fabric take-up means. In addition, the loom is provided with a carrier extending across the warp and movable lengthwise of the warp. The carrier is provided with hooks mounted movably on the carrier and operable with the carrier to engage pile warp yarns and draw them out of the shed to form loops. In the operation of the loom, the weaving means are periodically stopped and, in each such period of rest, the carrier and hooks are manipulated to form loops. When that action has been completed, the weaving means are started again and the weaving continues until the next stoppage and the next set of loops are formed. The hooks which have formed the loops retain control thereof until a plurality of picks have been inserted in the next weaving operation and, if the loops are to be cut, the severing is effected during that weaving operation. If uncut loops are desired, the hooks continue to hold the yarns, until just before the next loop forming operation starts, at which time, the hooks release the loops.

For a better understanding of the invention, reference may be made to the accompanying drawings, in which Fig. 1 is a view of one form of the new loom in front elevation with parts broken away;

Fig. 3 is a view on the line 3—3 of Fig. 1 with parts omitted;

Fig. 4 is a view in side elevation of the parts shown in Fig. 3;

Fig. 9 is a sectional view on the line 9—9 of Fig. 1;

Fig. 10 is a sectional view on the line 10—10 of Fig. 1;

Fig. 11 is an elevational view of the parts shown in Fig. 10;

Fig. 12 is a front elevational view of the loom, on an enlarged scale and with parts omitted;

Fig. 13 is a sectional view on the line 13—13 of Fig. 12;

Fig. 14 is a sectional view on the line 14—14 of Figs 1 and 12;

Figs. 15 and 16 are views, partly in plan and partly in section, showing the mode of operation of the clutch shown in Fig. 14;

Fig. 17 is a view in side elevation of a part of the clutch operating mechanism;

Fig. 18 is a sectional view on the line 18—18 of Fig. 1, with parts omitted;

Fig. 19 is a sectional view on the line 19—19 of Fig. 1;

Fig. 20 is an elevational view of the parts shown in Figs. 18 and 19;

Fig. 21 is a fragmentary plan view of parts shown in Fig. 20;

Fig. 22 is a sectional view, with parts omitted, on the line 22—22 of Fig. 18;

Fig. 23 is a sectional view on the line 23—23 of Fig. 22;

Fig. 24 is a plan view, with parts broken away, of the pile forming mechanism;

Fig. 25 is an elevational view, with parts broken away, of the mechanism shown in Fig. 24;

Fig. 26 is a sectional view on the line 26—26 of Fig. 24;

Fig. 27 is a fragmentary plan view of parts of the pile forming mechanism;

Fig. 28 is a sectional view on the line 28—28 of Fig. 26;

Fig. 29 is a fragmentary elevational view, showing the knife operating mechanism;

Fig. 30 is an elevational view of the mechanism shown in Fig. 29 at right angles to that figure;

Figure 42:
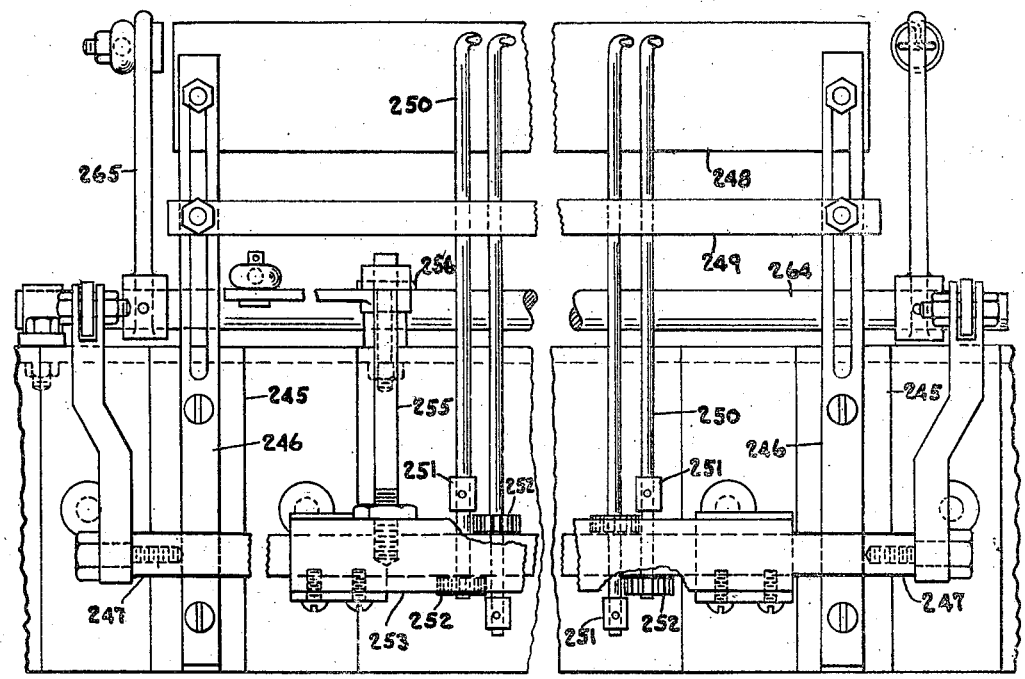
Figure 43:
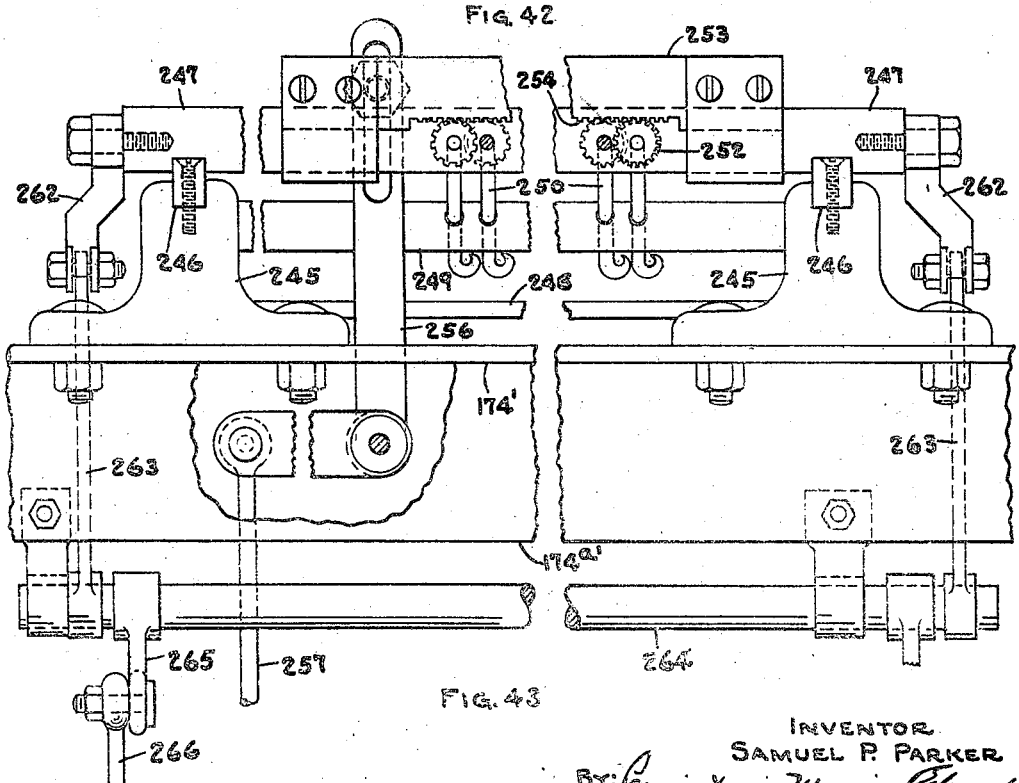
Figure 46:
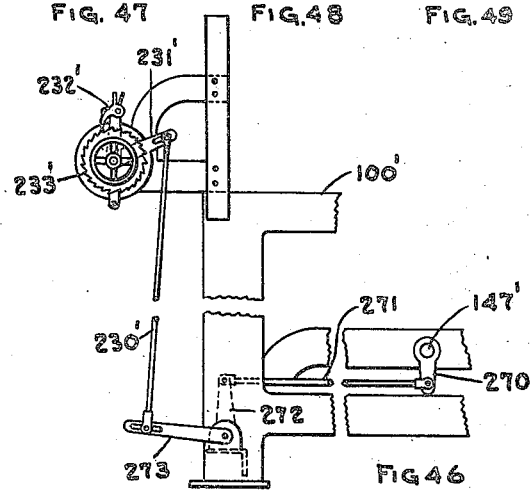

Figs. 31 to 35, inclusive, are plan views showing the mode of operation of the pile hooks;

Figs. 36 to 40, inclusive, are sectional views showing the mode of operation of the pile hooks;

Fig. 41 is a view in front elevation, with parts omitted, showing another form of the new loom;

Fig. 42 is a plan view, with parts broken away, of the pile forming mechanism of the loom of Fig. 41;

Fig. 43 is a front elevational view, with parts broken away, of the mechanism shown in Fig. 42;

Fig. 44 is a longitudinal sectional view on the line 44—44 of Fig. 41;

Fig. 45 is a sectional view on the line 45—45 of Fig. 44;

Fig. 46 is a diagrammatic elevational view of parts of the loom shown in Fig. 41;

Figs. 47 to 52, inclusive, are elevational views, showing the mode of operation of the pile hooks of the loom of Fig. 41;

Figs. 53 to 58, inclusive, are plan views corresponding, respectively, to Figs. 47 to 52, inclusive; and Figs. 59 to 64, inclusive, are sectional views, showing the mode of operation of the pile hooks of the loom of Fig. 41.

In the drawings, there are illustrated two forms of the loom of the invention, which are generally similar, but differ in the respect that one form produces a fabric with cut pile while the fabric produced on the other has pile loops. The first form of the loom, accordingly, includes features, such as a knife mechanism, additional to those employed on the second form.

The first form of the loom is illustrated in Figs. 1 to 40, inclusive, and it includes the usual loom sides 100, 100 connected by an arch 101. The ground warp beam 102 and the pile warp beam 103 are supported on the loom in the usual way and the ground warp yarns 104 are manipulated for shedding by harnesses 105, 106, while the pile warp yarns 107 are handled by harness 108. The harnesses are operated by harness levers 109 connected to the harnesses by straps 110 and controlled by a dobby head generally designated 111. The loom includes a lay 112, the usual shuttle boxes 113, picker sticks 114, and battery 115. The loom is driven by a motor 116 and the fabric is taken up on a take-up roll 117.

The motor shaft 116a carries a pinion 118 (Fig. 4) which meshes with a gear 119 which is loosely mounted on the loom crankshaft 120. A gear 121 (Fig. 6) is fast on shaft 120 and one face of the gear is attached to a disc 122 having a cork facing 123. Gear 119 may be moved along the shaft into engagement with the facing on disc 122 and, when held in that position, gear 119 drives the disc and shaft 120. The means for moving gear 119 against the facing on disc 122 and holding the gear in that position include a collar 124 loose on shaft 120 and movable along the shaft by a yoke 125 pivotally mounted on a frame member 126 and engaging pins 127 on a ring 128 freely encircling the collar and held against endwise movement thereon.

The yoke can be swung by a lever 129 (Fig. 5) connected by a rod 130 to a lever 131 acted on by a spring 131a and connected by a link to one arm 132 of a bell crank fast on a shaft 133. The other arm of the bell crank terminates in a handle 134. A stirrup 135 straddling a part of collar 124 carries a pin on which are mounted a pair of links 136 connected to levers 137 pivotally mounted on a collar 138 fast on shaft 120. The ends of levers 137 bear against the face of the hub of gear 119 and, when yoke 125 is swung in one direction by rocking of shaft 133, levers 137 swing to force gear 119 into contact with the facing 123 on disc 122, and gear 119 then drives shaft 120. When the yoke is swung in the opposite direction, shaft 120 remains at rest but gear 119 continues to rotate as long as motor 116 is operating.

A sprocket wheel 139 on the hub of gear 119 is connected by a chain 140 (Figs. 3, 4) to a sprocket wheel 141 on a stud 142. A sprocket wheel 143 on the stud is connected to sprocket wheel 141 and is also connected by a chain 144 to a sprocket wheel 145 connected to a tubular shaft 146 (Fig. 12) mounted on a shaft 147 supported for rotation in suitable bearings. Shaft 147 drives the pile forming mechanism, as will presently be explained.

Gear 121 fast on shaft 120 meshes with a gear 148 on the loom cam shaft 149. Accordingly, so long as motor 116 is running, its shaft 116a, which is the drive shaft for the loom, causes continuous rotation of gear 119 and tubular shaft 146. When gear 119 is moved and held against the facing on disc 122 fast to gear 121, which is in turn fast on shaft 120, the motor drives shafts 120 and 149, and the dobby head, the harnesses, the shedding and picking mechanisms, and the fabric take-up operate in the ordinary manner. When gear 119 is free of disc 122, the ordinary weaving mechanisms stop and the pile forming mechanism is caused to function.

The pile forming mechanism is driven from tubular shaft 146 through a clutch, one element of which is a plate 151 (Figs. 14–16, inclusive) fast on the end of the tubular shaft. The other element is a plate 152 fast on shaft 147. The plate 151 is formed with a plurality of openings near its edge and plate 152 has a hub on which is pivoted a lever 153 having an end movable through an opening in plate 152 into one of the openings in plate 151 to connect the plates together and thus cause tubular shaft 146 to drive shaft 147. Lever 153 is urged to locking position by a spring 154 on plate 152 and can be moved to inoperative position by a plate 155 pivotally mounted and movable into the path described by the tail of lever 153 as it rotates with plate 152. A spring 156 tends to swing plate 155 to a position, in which it is engaged by the tail of lever 153 and swings the latter to inoperative position. A bell crank lever 157 is mounted near plate 155 and is connected thereto by a link 158. A rod 159 is also attached to lever 157 and, when rod 159 is pulled, plate 155 is moved away from lever 153 and the latter is swung by its spring 154 to cause plate 151 and 152 to be connected. When rod 159 is released, spring 156 swings plate 155 into the path of the tail of lever 153 and, as the clutch rotates, ultimately lever 153 engages plate 155 and is caused thereby to swing to inoperative position. The clutch is thereupon disengaged and shaft 147 comes to rest.

The clutch 151, 152 is controlled by a harness lever 160 (Fig. 12) operated by the dobby 111, and there is such an amount of play in the connections between lever 160 and plate 155 of the clutch, that the plate is not actuated to throw in the clutch until lever 160 is about to reach the upper end of its stroke. When the lever 160 starts down again, only a small movement of the lever is required to permit plate 155 to swing back into the path of lever 153 of the clutch, so that the engagement of plate 155 with lever 153 will cause lever 153 to disengage the clutch, after the clutch plates 151, 152 have made a single revolution.

The loom is timed to stop when lever 160 has moved down the short distance necessary to permit plate 155 to swing back into the path of lever 153 and, for this purpose, lever 160 is connected by a rod 161 to a bell crank 162, which is also connected to rod 159. Bell crank 162 is also connected by link 163 to one arm of a bell crank 164, the other arm of which is connected by rod 165 to a lever 166 (Fig. 13) forming part of a knock-off. This device includes a cam 167 on the loom cam shaft 149, the cam swinging a lever 168. Lever 166 is attached at one end to a lever 169, and its other end normally lies out of the path of a part of lever 168, as the latter is swung by cam 167. Lever 169 is connected by a rod 170 to an arm 171 pivotally mounted and connected to an arm 172, which is engageable with an arm 173 on the shaft 133. As the harness lever 160 rises, it swings arm 166 upwardly and the end of the arm lies in front of a part of lever 168, when the harness lever is adjacent the upper end of its stroke. When arm 166 is in that position and lever 160 is traveling down, lever 168 is swung by its cam to engage lever 166 and act through that lever and the other parts described to rock shaft 133 and release gear 119 from disc 122. Accordingly, the harness lever 160 causes clutch 151, 152 to be engaged and shaft 147 to be started, when lever 160 is close to the end of its up stroke, and lever 160 causes shaft 120 and the weaving devices driven thereby to be stopped just after the lever starts its down stroke.

The pile forming mechanism comprises a plate 174 (Figs. 2 and 26) mounted on the loom sides and extending across the loom. A pair of blocks 175 are mounted upon the plate at its ends, the blocks having downwardly and rearwardly inclined top surfaces. A carrier 176 is supported at its ends on the blocks and is held in place by overhanging angle pieces 177 attached to the plate 174. Each block is provided with a passage through it in which is mounted a pinion 178 which meshes with a gear 179 fast on a shaft 180 supported on bearings attached to the underside of the plate. The pinions 178 also mesh with racks 181 attached to the carrier at its ends. By rotation of shaft 180 in opposite directions, the carrier may be moved back and forth lengthwise of the warp.

The carrier 176 has a lengthwise slot 176a in its forward face and within the slot are pivotally mounted the ends of pile hooks 182. Each hook is made of a pair of flat metal strips 183 placed one above the other and kept spaced at their pivoted ends by a washer 184 encircling the screw 185 serving as the pivot pin. At their free ends, the strips are formed with recesses 182a and the ends of the strips are kept separated by metal pieces 186 suitably secured in place. The hooks are all pivotally connected near their pivoted ends by a cross-bar 187 and near their free ends, they pass through openings in a cross-bar 188 extending across the entire group of hooks and mounted on arms 189 which are pivotally attached to the plate 174 (Fig. 24).

The cross-bar 188 is of inverted L-shape and it overlies a knife 190, which extends through the hooks 182 between the upper and lower strips 183 thereof. The knife is mounted in adjustable holders 191 (Fig. 30) attached to bell cranks 192 mounted on a depending portion 174a of plate 174. The bell cranks are connected by rods 193 to arms 194 on a shaft 195 mounted in the loom sides and provided with an arm 196 connected by linkage and a bell crank 197 to an eccentric pin on a pinion 198 driven by a gear on the loom crank shaft 120. With this arrangement, the knife is continually reciprocated endwise so long as the loom crank shaft is rotating.

Cross-bar 188 is movable endwise to swing the hooks in unison on their respective pivots and for the purpose, one of the arms 189 is provided with a block 199 (Figs. 18, 22, 23) welded in place on its under surface. The block has a depression in its bottom in which is received the end of an arm of a bell crank 200 pivotally mounted on plate 174a. The other arm of the bell crank is connected by a rod 201 (Fig. 18) to one end of a lever 202 pivotally mounted on an arm 203 attached to one of the loom girts. The other end of the lever is held by a spring 204 against a cam 205 on shaft 147. Rotation of the shaft, accordingly, causes the cross-bar 188 to move back and forth once per revolution of the shaft.

In order to hold cross-bar 188 in such position that the hooks 182 extend parallel with the warp yarns, a latch 206 (Figs. 19, 20, 24) is pivotally mounted on plate 174a and may be swung to engage the side of one of the arms 189 and hold it against movement. The latch is moved to and from operative position by a rod 207 attached to one end of a lever 208 pivoted on arm 203. The other end of the lever is acted on by a cam 209 on shaft 147 and the latch releases arms 189 once per revolution of the shaft.

Figure 1:
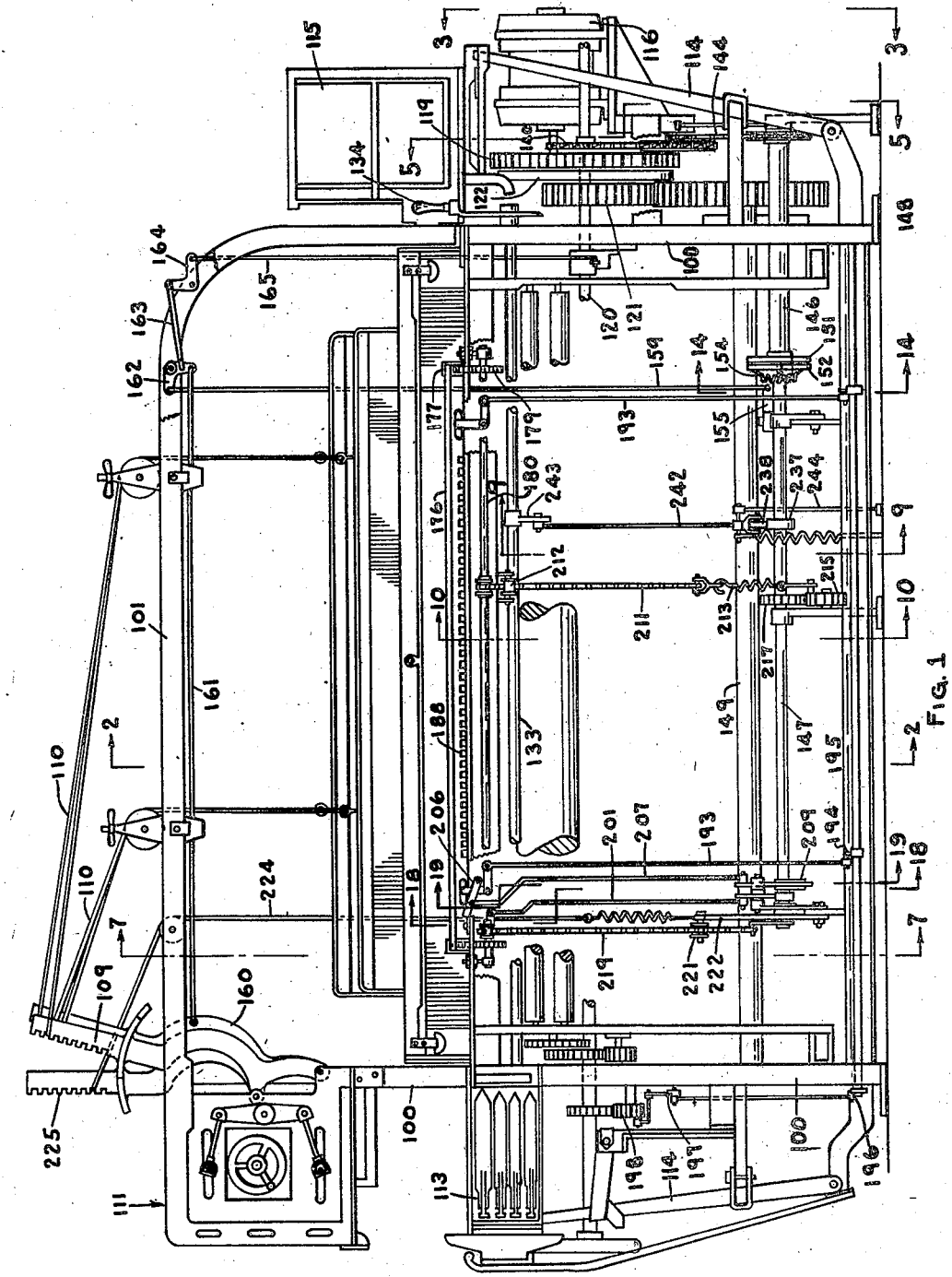
Figure 2:
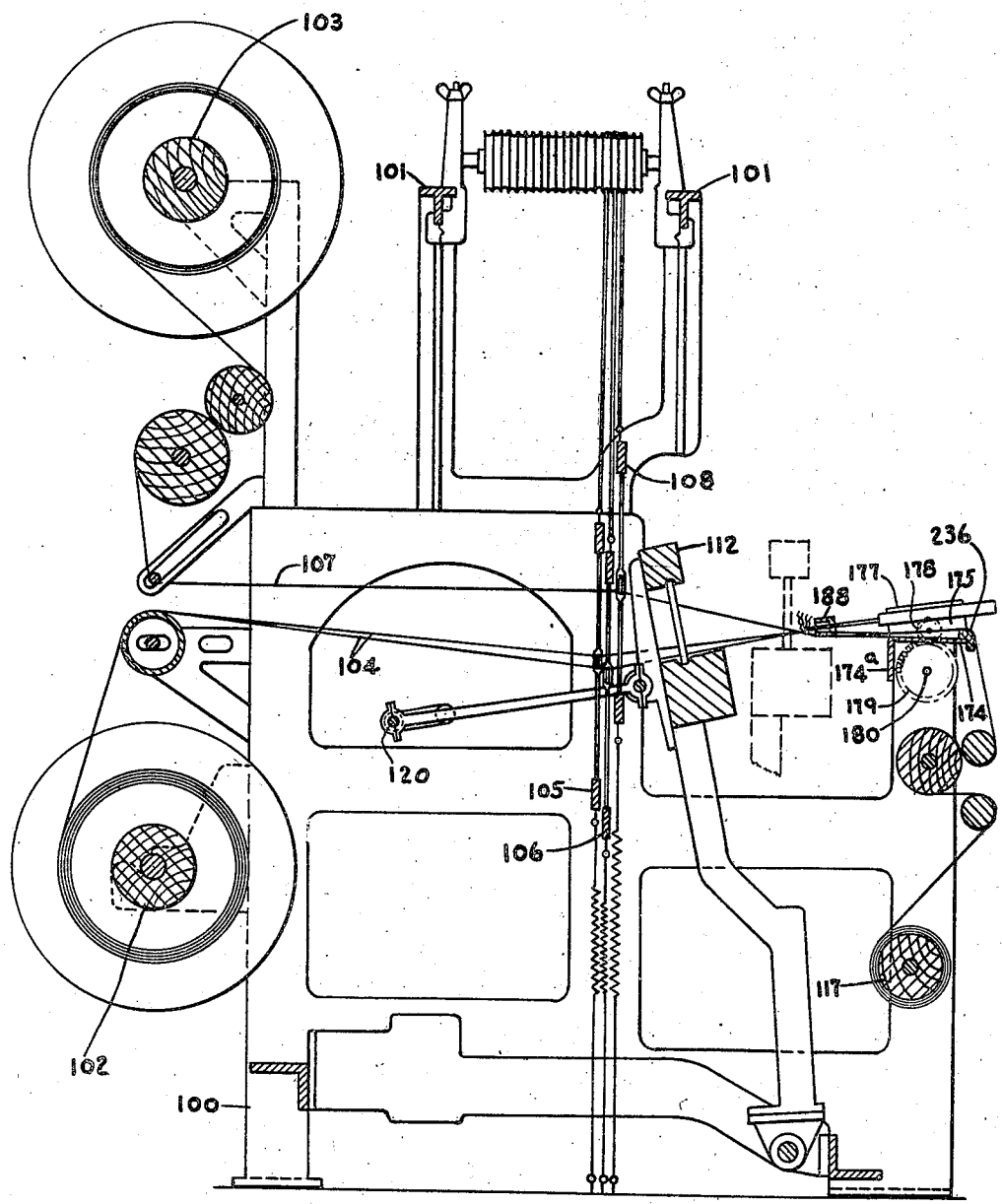
Fig. 2 is a longitudinal sectional view on the line 2—2 of Fig. 1 with parts omitted.
Figures 5, 6:
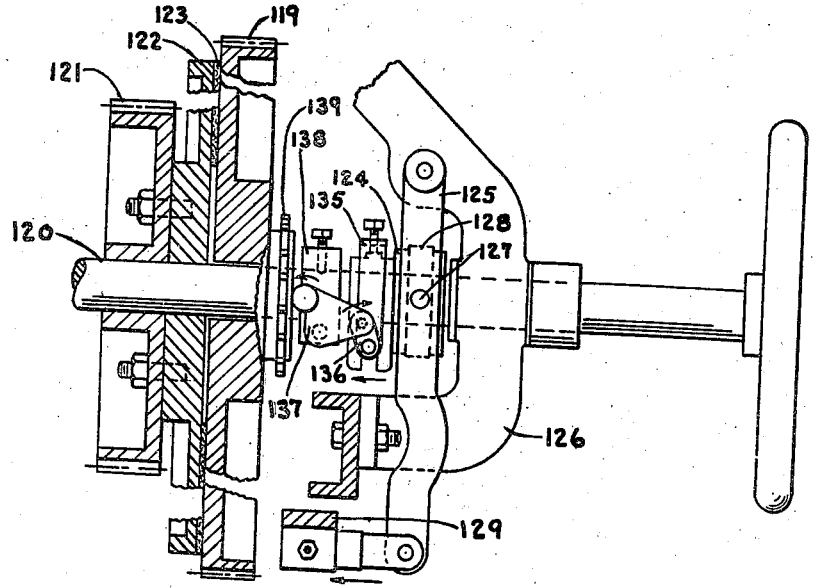
Fig. 5 is a sectional view on the line 5—5 of Fig. 1.
Fig. 6 is a sectional view on the line 6—6 of Fig. 5.
Figure 8:
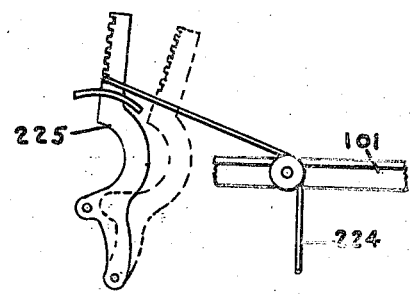
Fig. 8 is an elevational view showing parts associated with those shown in Fig. 7.
Figure 7:
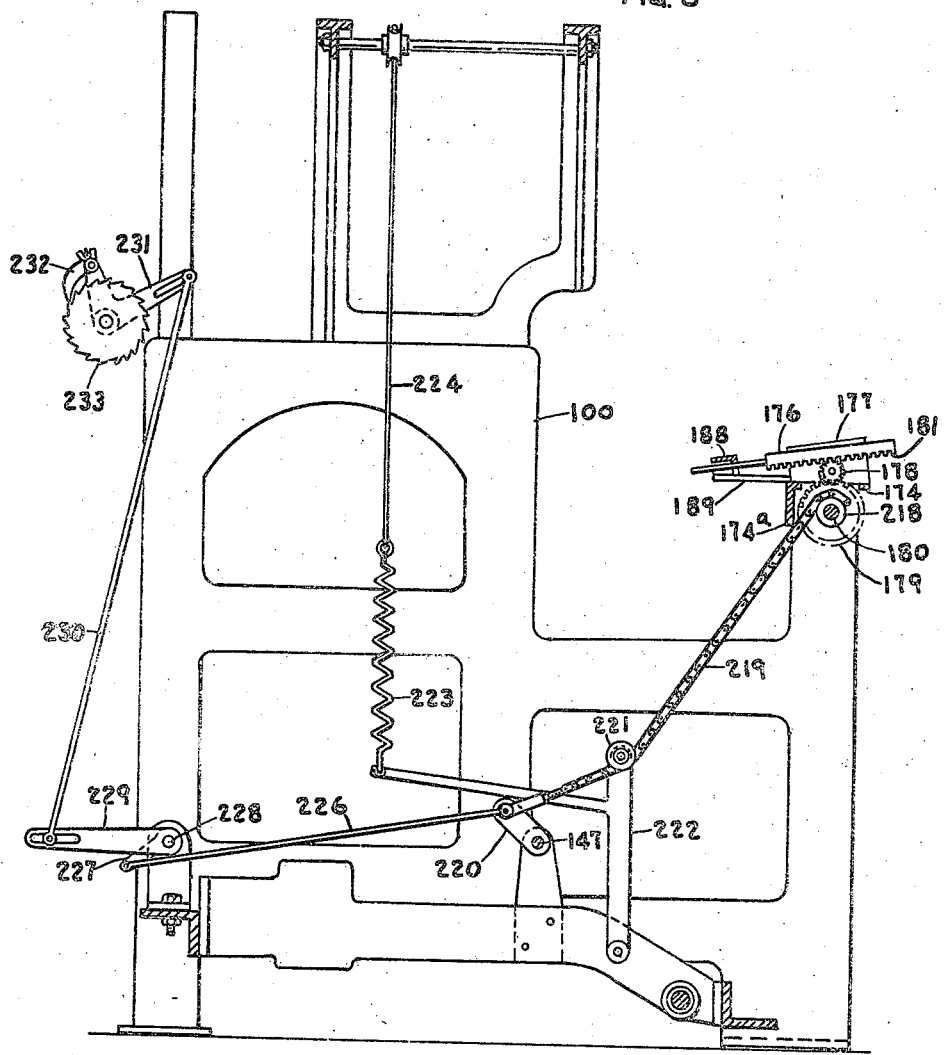
Fig. 7 is a sectional view on the line 7—7 of Fig. 1.

The movement of the carrier 176 and hooks 182 lengthwise of the warp threads is achieved by rocking shaft 180 carrying gears 179. The shaft is provided with a pulley 210 (Figs. 10, 11, 25) to which is attached one end of chain 211, which passes over an idler pulley 212 attached to plate 174a and is attached at its other end to a spring 213. The spring is connected by a link 214 to an eccentric pin on a gear 215 mounted on a stud on a standard 216 and meshing with gear 217 on shaft 147. Shaft 180 is also provided with another pulley 218 (Fig. 7) to which is attached one end of chain 219. The chain is connected at its other end to an arm 220 fast on shaft 147. Chain 219 is engaged by an idler pulley 221 on an arm 222 pivoted on a loom girt, and arm 222 has a branch connected by a spring 223 to a wire 224 which is connected to a harness lever 225 (Fig. 8). The action of chains 211 and 219 and their driving mechanism is such that, during one revolution of shaft 147, chain 211 first acts to rotate shaft 180 to cause carrier 176 and the hooks to move toward the shed, after which chain 219 rotates shaft 180 in the reverse direction and the carrier and hooks return to their original positions. In such positions, the ends of the hooks are spaced from knife 190 and to cause the knife to act, the hooks must be moved still farther away from the shed. This is accomplished by harness lever 225 which acts to swing arm 222, so that idler 221 causes chain 219 to be pulled. This results in a partial rotation of shaft 180 sufficient to move the carrier and hooks to the desired extent. Such rotation of shaft 180 also acts to pull on chain 211 but that pull merely causes spring 213 to be stretched slightly.

Arm 220 (Fig. 7) on shaft 147 is connected by rod 226 to an arm 227 pivoted on a stud 228 on one of the loom sides and attached to another arm 229 connected by a rod 230 to one arm of a bell crank 231. A pawl 232 on the bell crank engages the ratchet wheel 233 of the pile warp beam let-off, so that, when arm 220 acts to draw on chain 219 and move the carrier and hooks away from the shed, the let-off causes rotation of the pile warp beam to let off pile warp yarns.

The fabric lying forward of the fell of the goods passes beneath a cloth board 234 mounted on arms 235 (Figs. 24, 26) attached to plate 174. The fabric extends over the top of plate 174 and is held clear of the plate by means of a guide plate 236 (Fig. 2) attached to the forward edge of plate 174. From the guide plate, the fabric passes to the take-up devices.

In order that the weaving mechanisms of the loom may be started again after a period of rest, the shaft 147 is provided with a cam 237 (Figs. 5, 9) which engages a roller 238 on an arm 239 pivoted on a standard 240. The arm is acted on by a spring 241 to hold the roller against the cam and it is connected by a rod 242 to an arm 243 fast on the shaft 133. A stop rod 244 attached to arm 239 limits its downward movement. Rotation of cam 237 with shaft 147 causes shaft 133 to be rocked, once per revolution of shaft 147, to cause movement of yoke 125 to move gear 119 against disc 123 and cause shaft 120 to be driven by motor 116.

In the operation of the loom above described, the motor 116 is first started and then shaft 133 is rocked by handle 134 to swing yoke 125 to cause crankshaft 120 to be driven. Rotation of crankshaft 120 causes rotation of the cam shaft 149 of the loom and the loom functions in the usual way to form sheds of the pile yarns, insert picks of filling yarn in the sheds, and beat up the picks. The fabric so made is a plain goods or backing and the adjustment of the dobby head is such that, after the production of a length of such fabric, involving the insertion of a selected number of picks, for example, ten, the harness lever 160 is swung upward by the dobby and, near the end of its upward stroke, it swings plate 155 away from lever 153 of clutch 151, 152, and lever 153 is then moved by its spring 154 to connect plates 151, 152. Tubular shaft 146 is driven from the sprocket wheel 139 on the hub of gear 119 and is, accordingly, rotating throughout the operation of the motor and is driving clutch plate 151 with it. When lever 153 is released by the swinging of plate 155, it throws in clutch 151, 152, and shaft 147 begins to rotate. Just after the harness lever 160 starts its down stroke, it operates the knock-off and rock shaft 133 to swing yoke 125 to permit gear 119 to become disengaged from disc 122. Shaft 120 then stops and this stops the weaving mechanisms of the loom. Before the loom is stopped, lever 160 has moved down a sufficient amount to permit plate 155 to swing into the path of the tail of lever 153 of the clutch. When shaft 147 has made a complete revolution, lever 153 of the clutch is swung by plate 155 to release the clutch. Accordingly, the clutch may be referred to as a "one-revolution" clutch, and it will be apparent that, once shaft 147 is started, it makes one revolution and then stops.

Figure 33:
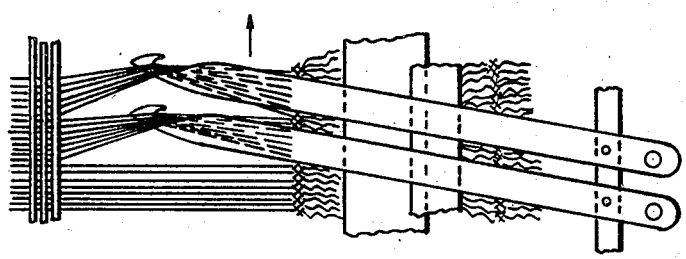
Figure 32:
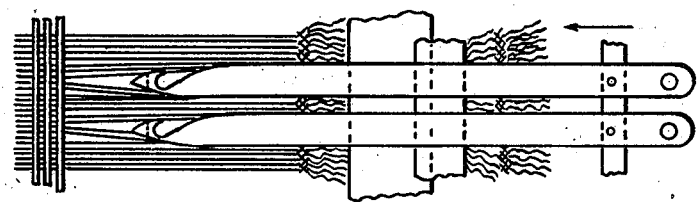
Figure 31:
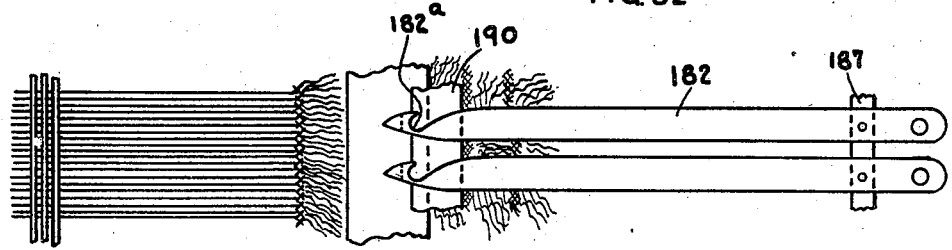
Figure 37:
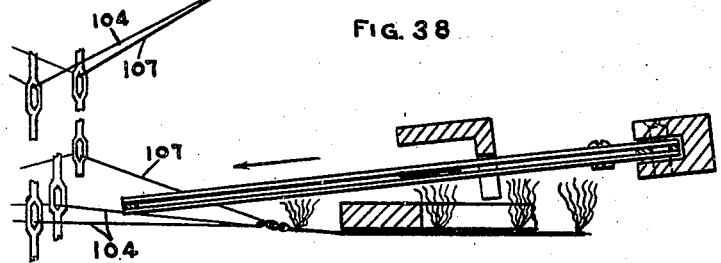
Figure 36:
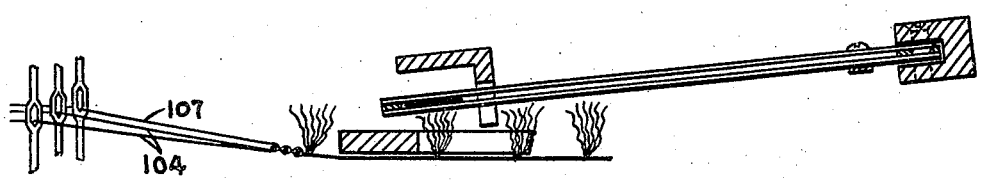

When the weaving mechanisms have come to rest, the pile warp yarns 107 are held in the up position by their harness 108 and the ground warp yarns 104 are in the down position. The pick laid within the shed so formed can not be beaten up and is subsequently cut at both ends and withdrawn. At the time the loom stops, the carrier 176 is in the position shown in Figs. 31 and 36, that is, back from the shed and with the bottoms of the recesses 182a of hooks 182 free of the cutting edge of knife 190. At that time, the knife, which is reciprocated by the rotation of the loom crank shaft, is at rest. When the shaft 147 starts to rotate, it first causes chain 211 to be pulled and this causes the carrier to advance toward the shed and the hooks to pass between the pile warp threads, as shown in Figs. 32 and 37. As soon as the hooks have reached this position, the latch 206 is released and arms 189 are swung to move the cross-bar 188 endwise. This swings the hooks so that their recesses 182a are in position to engage the warp yarns (Fig. 33). Chain 219 is now pulled to cause the carrier and hooks to move away from the shed, the hooks drawing the pile yarns from the shed with them. As the hooks move away from the shed, arms 189 are swung back to return cross-bar 188 and the hooks to their original positions, and the arms 189 are locked in place by latch 206, which again becomes operative. During the return movement of the hooks, the pile warp yarn beam let-off functions so that the hooks can draw out the pile yarns without breaking them.

As the hooks approach their original positions (Fig. 34), the shaft 147 will have nearly completed a revolution and cam 237 now functions to rock shaft 133, so that gear 119 will engage disc 122 and cause shaft 120 to rotate and drive the weaving mechanisms. At the same time, plate 155 rocks lever 153 to disengage clutch 151, 152 and shaft 147 comes to rest. At this time, the pile yarns are held by the hooks to form loops and the weaving proceeds through another cycle of ten picks. The insertion of such picks causes the pile loops held by the hooks to be firmly bound in place. After the insertion of a few picks, for example, six, the loops of pile are cut and this is accomplished as follows.

Figure 35:
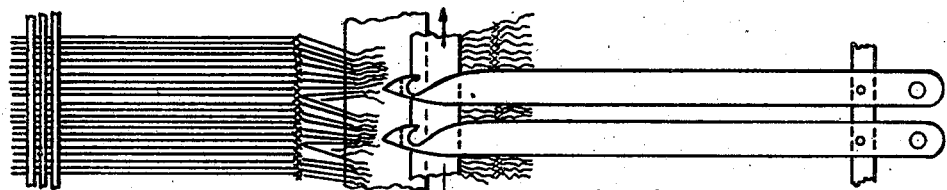
Figure 34:
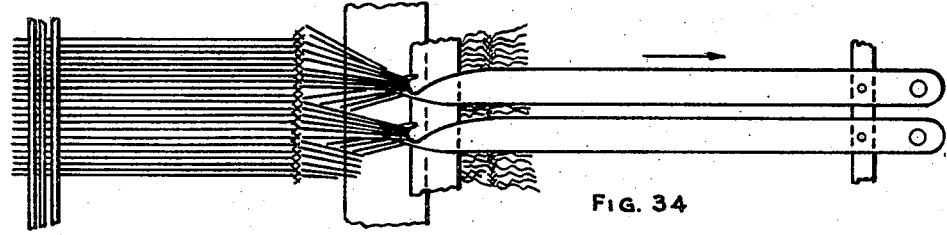
Figure 40:
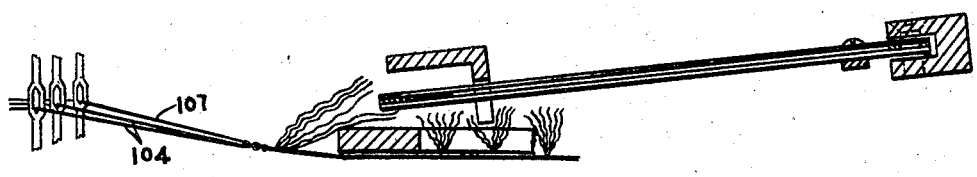
Figure 39:
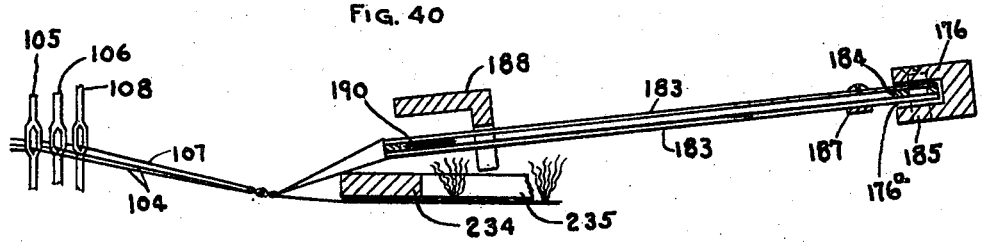
Figure 38:
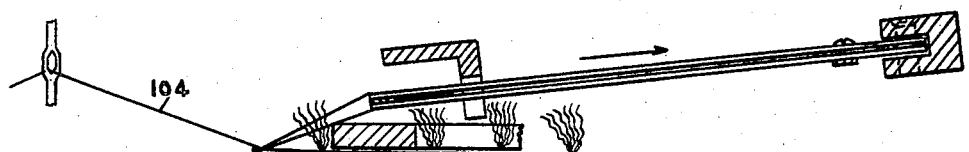

At the proper instant during the weaving, harness lever 225 is swung to cause lever 222 to rock. This causes a pull on chain 219 which rotates shaft 180 and causes a movement of carrier 176 and the hooks sufficient to bring the bights of the yarns on the hooks against the edge of the reciprocating knife 190 (Figs. 35, 40). The pile loops are thus cut and harness lever 225 returns to its original position, while the carrier and hooks are moved away from the knife by rotation of shaft 180 caused by the contraction of spring 213.

The production of the fabric continues with the loom weaving plain goods for a number of picks, as determined by the setting of the dobby head, following which the weaving mechanisms come to rest, and the pile forming mechanism operates to form pile loops. The length of the loops depends on the length of the path of travel of the hooks away from the shed, after the hooks have engaged the pile yarns, and may be varied by suitable adjustments of the mechanism. The drawing out of the loops takes place during one revolution of shaft 147 and, after the loops have been drawn, the weaving mechanisms automatically start and the cycle of operations is repeated indefinitely.

The form of the new loom shown in Figs. 41 to 64, inclusive, is generally the same as the first form but differs with respect to the pile forming mechanism. In Figs. 41 to 64, inclusive, parts which are the same as those in Figs. 1 to 41, inclusive, are identified by the same reference characters to which prime marks have been added.

In the second form of the loom, plate 174' is mounted on the loom sides 100' and supports blocks 245 which have downwardly and rearwardly inclined tops on which are mounted tracks 246. A carrier 247 rests on the tracks and has recesses in its under surface into which the tracks extend. The tracks project rearwardly beyond the edge of plate 174 and carry a cloth board 248 attached to their under surfaces at their free ends. A cross-bar 249 is mounted on the tracks forward of the cloth board.

A plurality of hooks 250 are mounted side by side in openings in carrier 247 and each hook is provided with a collar 251 and a pinion 252 lying on opposite sides of the carrier, alternate hooks having their collars and pinions in reverse arrangement. A slide 253 is mounted on top of the carrier for movement endwise thereof and the slide has racks 254 on its under surface meshing with the pinions on the hooks. The slide has a rearwardly projecting stud 255 which extends through a slot in one arm of a bell crank 256 pivoted on a depending portion of plate 174'. The other arm of the bell crank is attached by a rod 257 to one end of a lever 258 which carries a roller 259 rolling on a cam 260 on shaft 147'. A spring 261 holds the lever with the roller engaging the cam at all times.

The carrier 247 is provided at its ends with arms 262 connected to arms 263 fast on a shaft 264 mounted on bearings attached to plate 174'. An arm 265 fast on the shaft is connected by a rod 266 to one end of a lever 267 provided with a roller 268 traveling in a cam slot in a cam 269 on shaft 147'.

In order to let off pile warp yarn during the drawing out of the pile loops, shaft 147' is provided with an arm 270 connected by a rod 271 to an arm 272 pivoted on a stud and attached to arm 273 connected by a rod 230' to one arm of a bell crank 231' carrying a pawl 232' on the shaft of the pile warp beam let-off. As the shaft 147' rotates, the pawl is operated to cause the pile warp yarn to be let off.

In the operation of the loom shown in Figs. 41 to 46, inclusive, the weaving mechanisms of the loom operate in the usual way to produce a ground fabric, and, after the insertion of a selected number of picks, harness lever 160' is brought into action by the dobby head 111' and causes rods 159' and 165' to be pulled. The movement of rod 159' causes clutch 151', 152' to be engaged, so that shaft 147' is driven. The movement of rod 165' operates through the knock-off to cause rocking of shaft 133' with the result that the weaving mechanisms are brought to rest.

Figures 53, 54, 55, 56, 57, 58:
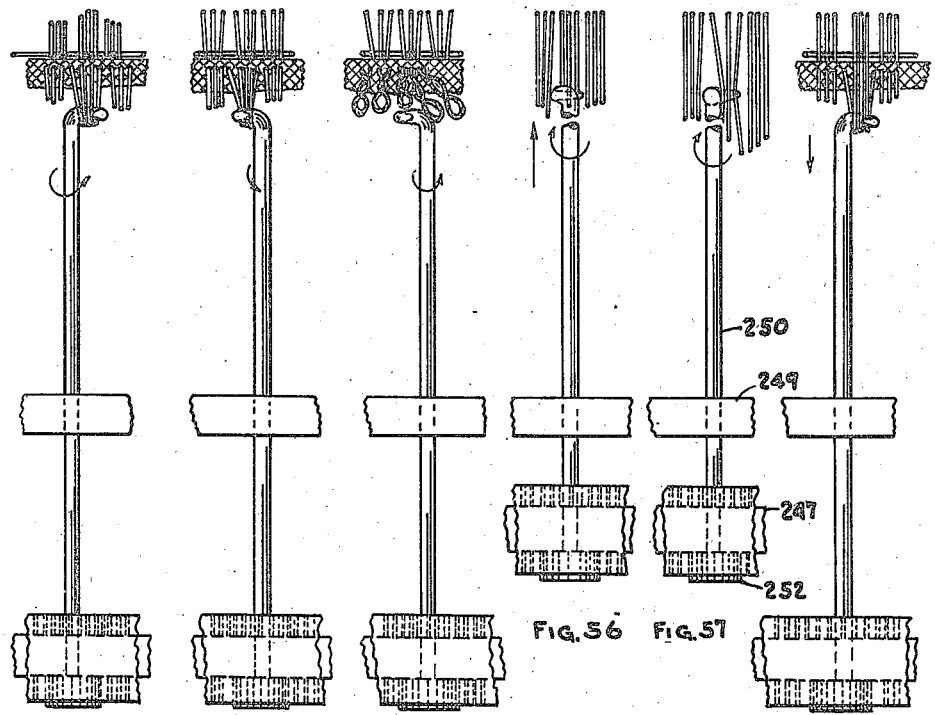
Figures 47, 48, 49, 50, 51, 52:
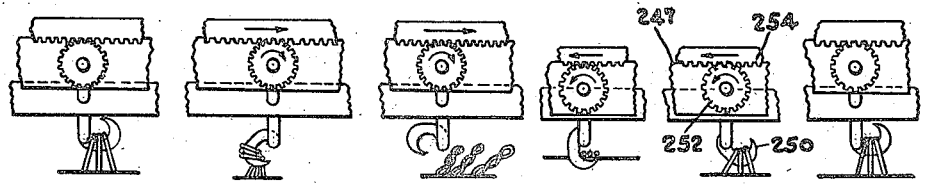

At the time that shaft 147' begins to rotate, the hooks 250 are in their positions remote from the shed and the end of each hook is engaged with a plurality of loops of pile yarn as shown in Figs. 47, 53. As soon as shaft 147 starts to rotate, the slide 253 starts moving to the right (Fig. 43), and this causes a clockwise rotation of the hooks so that their ends become disengaged from the pile loops (Figs. 48, 49, 54, 55). Carrier 247 is then moved toward the shed and just as the ends of the hooks reach the pile yarns which are in the up position, slide 253 begins to move to the left (Fig. 43). This causes clockwise rotation of the hooks and their ends pass between the warp threads (Figs. 50, 51, 56, 57). The slide then stops and the carrier 247 and the hooks move away from the shed and the hooks draw out the pile yarns to form loops (Figs. 52, 58). As the hooks draw out the pile yarns, the pile warp beam let-off is actuated, so that the pile yarns may be formed into loops without danger of breakage. As soon as the carrier and hooks have returned to their original positions, shaft 147' will have made a complete rotation, and clutch 151', 152' is thereupon disengaged and cam 237' operates through lever 239' to rock shaft 133' and start the weaving mechanisms of the loom again. Disengagement of clutch 151', 152' stops shaft 147' and causes the pile forming mechanism to come to rest. The weaving of the ground fabric then proceeds until after the weaving mechanism stops and the cycle of operation is repeated.

In both forms of the new loom, the pile forming mechanism may be considered to be a separate attachment, since it is wholly distinct from the ordinary weaving mechanisms of the loom and may be readily removed from the loom and replaced as may be required. The operation of drawing out the pile loops is carried on rapidly and during a single revolution of shaft 147, so that the production of the pile fabric on the loom is carried on at a rapid rate and the loom operates with high efficiency.

This application is a continuation-in-part of my application Serial No. 501,597 filed September 9, 1943.

What is claimed is:

1. In a loom which includes means for supplying pile and ground warp yarns, let-off means for the pile warp yarns, shedding means for forming the warp yarns into sheds, and means for inserting picks of filling yarn into the sheds, the combination of means acting intermittently to stop the shedding and inserting means, means operating in each period of rest of the shedding and inserting means to draw pile yarns from their positions in the shed to form pile loops and also operating to actuate the let-off means for the pile warp yarns, and means acting to start the shedding and inserting means after the pile yarns have been drawn out.

2. In a loom which includes means for supplying pile and ground warp yarns, shedding means for forming the warp yarns into sheds, and means for inserting picks of filling yarn into the sheds, the combination of means acting intermittently to stop the shedding and inserting means, means brought into action by the stopping means and operating during each period of rest of the shedding and inserting means to draw pile yarns from their positions in the shed to form pile loops, and means operated by the loop forming means to start the shedding and inserting means after the pile yarns have been drawn out.

3. In a loom which includes means for supplying pile and ground warp yarns, shedding means for forming the warp yarns into sheds, and means for inserting picks of filling yarn into the sheds, the combination of means acting intermittently to stop the shedding and inserting means, means operating in each period of rest of the shedding and inserting means to draw pile yarns from their positions in the shed to form pile loops, and means brought into action by the drawing means at the end of a cycle of operation thereof to start the shedding and inserting means.

4. In a loom which includes means for supplying pile and ground warp yarns, shedding means for forming the warp yarns into sheds, and means for inserting picks of filling yarn into the sheds, the combination of means acting intermittently to stop the shedding and inserting means, means brought into action by the stopping means and operating during each period of rest of the shedding and inserting means to draw pile yarns from their positions in the shed to form pile loops, and means brought into action by the drawing means at the end of a cycle of operation thereof to start the shedding and inserting means.

5. In a loom which includes means for supplying pile and ground warp yarns, let-off means for the pile warp yarns, shedding means for forming the warp yarns into sheds, and means for inserting picks of filling yarn into the sheds, the combination of means acting intermittently to stop the shedding and inserting means, a carrier extending across the warp and movable lengthwise of the warp, a plurality of hooks mounted movably on the carrier, means operating in each period of rest of the shedding and inserting means to advance the carrier to pass the hooks between the pile warp yarns, to move the hooks relative to the carrier after the hooks are between the pile warp yarns, to retract the carrier, and to operate the let-off means for the pile warp yarns, the hooks drawing the pile warp yarns from their positions in the shed to form loops, and means acting at the completion of the drawing out of the loops to start the shedding and inserting means.

6. In a loom which includes means for supplying pile and ground warp yarns, shedding means for forming the warp yarns into sheds, and means for inserting picks of filling yarn into the sheds, the combination of means acting intermittently to stop the shedding and inserting means, a carrier extending across the warp and movable lengthwise of the warp, a plurality of hooks mounted movably on the carrier, means brought into action by the stopping means and operating during each period of rest of the shedding and inserting means to advance the carrier to pass the hooks between the pile warp yarns, to move the hooks relative to the carrier after the hooks are between the pile warp yarns, and to retract the carrier, the hooks drawing the pile warp yarns from their positions in the shed to form loops, and means operated by the loop forming means at the completion of the drawing out of the loops to start the shedding and inserting means.

7. In a loom which includes means for supplying pile and ground warp yarns, shedding means for forming the warp yarns into sheds, means for inserting picks of filling yarn into the sheds, and a drive shaft by which the shedding and inserting means are driven, the combination of means acting intermittently to stop the shedding and inserting means by disconnecting them from the drive shaft, a second shaft, means driven by the second shaft and acting to draw pile yarns from the shed to form pile loops, and means operating at substantially the start of each period of rest of the shedding and inserting means for connecting the drive shaft to the second shaft.

8. In a loom which includes means for supplying pile and ground warp yarns, shedding means for forming the warp yarns into sheds, means for inserting picks of filling yarn into the sheds, and a drive shaft by which the shedding and inserting means are driven, the combination of means acting intermittently to stop the shedding and inserting means by disconnecting them from the drive shaft, a second shaft, means driven by the second shaft and acting to draw pile yarns from the shed to form pile loops, means operating at substantially the start of each period of rest of the shedding and inserting means for connecting the drive shaft to the second shaft, and means for disconnecting the shafts when the second shaft has rotated through a selected angle.

9. In a loom which includes means for supplying pile and ground warp yarns, shedding means for forming the warp yarns into sheds, means for inserting picks of filling yarn into the sheds, and a drive shaft by which the shedding and inserting means are driven, the combination of means acting intermittently to stop the shedding and inserting means by disconnecting them from the drive shaft, a second shaft, means driven by the second shaft and acting to draw pile yarns from the shed to form pile loops, means brought into action by the stopping means for connecting the shafts, and means for automatically disconnecting the shafts when the second shaft has rotated through a selected angle.

10. In a loom which includes means for supplying pile and ground warp yarns, shedding means for forming the warp yarns into sheds, means for inserting picks of filling yarn into the sheds, and a drive shaft by which the shedding and inserting means are driven, the combination of means acting intermittently to stop the shedding and inserting means by disconnecting them from the drive shaft, a second shaft, means driven by the second shaft and acting to draw pile yarns from the shed to form pile loops, a clutch for connecting the shafts, means actuated by the stopping means for throwing in the clutch, and means for automatically disconnecting the clutch when the second shaft has rotated through a selected angle.

11. In a loom which includes means for supplying ground and pile warp yarns, shedding means for forming the warp yarns into sheds, means for inserting picks of filling yarn into the sheds, and a drive shaft by which the shedding and inserting means are driven, the combination of means acting intermittently to stop the shedding and inserting means by disconnecting them from the drive shaft, a second shaft, means driven by the second shaft and acting to draw pile yarns from the shed to form pile loops, and means operating at substantially the start of each period of rest of the shedding and inserting means for causing the second shaft to be driven.

12. In a loom which includes means for supplying ground and pile warp yarns, shedding means for forming the warp yarns into sheds, means for inserting picks of filling yarn into the sheds, and a drive shaft by which the shedding and inserting means are driven, the combination of means acting intermittently to stop the shedding and inserting means by disconnecting them from the drive shaft, a second shaft, means driven by the second shaft and acting to draw pile yarns from the shed to form pile loops, and means operating at substantially the start of each period of rest of the shedding and inserting means for rotating the second shaft through a selected angle.

13. In a loom which includes means for supplying ground and pile warp yarns, shedding means for forming the warp yarns into sheds, means for inserting picks of filling yarn into the sheds, and a drive shaft by which the shedding and inserting means are driven, the combination of means acting intermittently to stop the shedding and inserting means by disconnecting them from the drive shaft, a second shaft, means driven by the second shaft and acting to draw pile yarns from the shed to form pile loops, and means brought into action by the stopping means for driving the second shaft for a limited period.

14. In a loom which includes means for supplying ground and pile warp yarns, shedding means for forming the warp yarns into sheds, means for inserting picks of filling yarns into the sheds and a drive shaft by which the shedding and inserting means are driven, the combination of means acting intermittently to stop the shedding and inserting means, a second shaft, means driven by the second shaft and acting to draw pile yarns from the shed to form pile loops, means operating at substantially the start of each period of rest of the shedding and inserting means for causing the second shaft to be driven, and means operable when the second shaft has rotated through a selected angle to stop the rotation of the second shaft and start the shedding and inserting means again.

15. In a loom which includes means for supplying ground and pile warp yarns, shedding means for forming the warp yarns into sheds, means for inserting picks of filling yarn into the sheds, and a drive shaft by which the shedding and inserting means are driven, the combination of means acting intermittently to stop the shedding and inserting means, a second shaft, means driven by the second shaft and acting to draw pile yarns from the shed to form pile loops, means brought into action by the stopping means for causing the second shaft to be rotated, and means acting when the second shaft has been rotated through a selected angle to stop its rotation and start the shedding and inserting means again.

16. In a loom which includes means for supplying ground and pile warp yarns, shedding means for forming the warp yarns into sheds, means for inserting picks of filling into the sheds, and a drive shaft by which the shedding and inserting means are driven, the combination of a carrier extending across the warp and movable lengthwise thereof, a plurality of hooks mounted movably on the carrier, means for moving the carrier toward and away from the shed, the hooks lying between pile warp yarns when the carrier is in its position nearest the shed, means for moving the hooks relative to the carrier when the latter is in said position to cause the hooks to engage and draw out pile warp yarns to form loops as the carrier moves away from the shed, means for intermittently stopping the shedding and inserting means, means actuated by the stopping means and operating the carrier and hook moving means, and means operating when the carrier has returned to its position away from the shed to start the shedding and inserting means again.

17. In a loom which includes means for supplying ground and pile warp yarns, shedding means for forming the warp yarns into sheds, means for inserting picks of filling into the sheds, and a drive shaft by which the shedding and inserting means are driven, the combination of a carrier extending across the warp and movable lengthwise thereof, a plurality of hooks mounted movably on the carrier, means for actuating the carrier and hooks through a cycle during which the carrier is moved to pass the hooks between the pile warp yarns in the shed, the hooks are moved to engage the yarns, and the carrier and hooks are moved to a position remote from the shed and draw out pile yarns to form loops, cutting means disposed across the warp, the cutting means lying adjacent the yarns held by the hooks when the carrier and hooks are in said position remote from the shed, means for intermittently stopping the shedding and inserting means, means operated by the stopping means for causing the carrier and hook actuating means to function, means operable at the end of a cycle of the carrier and hook actuating means for starting the shedding and inserting means again, and means operating after insertion of a plurality of picks for causing a relative movement of the carrier and hooks and the cutting means to cause the yarns engaged by the hooks to be severed by the cutting means.

18. In a loom which includes means for supplying ground and pile warp yarns, and weaving means for forming the warp yarns into sheds and inserting picks of filling into the sheds, the combination of means for intermittently stopping the weaving means, a carrier extending across the warp and movable lengthwise thereof, a plurality of hooks mounted movably on the carrier, means brought into action substantially simultaneously with the stopping of the weaving means for moving the carrier toward the shed to pass the hooks between the pile warp yarns, moving the hooks to cause them to engage the pile warp yarns, and moving the carrier away from the shed to draw out the pile warp yarns by the hooks to form pile loops, means operating when the carrier has been moved to a position away from the shed for starting the weaving means again, and cutting means operating after a plurality of picks have been inserted in the operation of the weaving means to sever the pile warp yarns at the hooks.

19. In a loom which includes means for supplying ground and pile warp yarns, and weaving means for forming the warp yarns into sheds and inserting picks of filling into the sheds, the combination of means for intermittently stopping the weaving means, a carrier extending across the warp and movable lengthwise thereof, a plurality of hooks mounted movably on the carrier, means brought into action substantially simultaneously with the stopping of the weaving means for moving the carrier toward the shed to pass the hooks between the pile warp yarns, moving the hooks to cause them to engage the pile warp yarns, and moving the carrier away from the shed to draw out the pile warp yarns by the hooks to form pile loops, means operating when the carrier has been moved to a position away from the shed for starting the weaving means again, cutting means disposed across the warp remote from the shed, means for operating the cutting means with the weaving means, and means, operable after a plurality of picks have been inserted in the operation of the weaving means following the drawing of the pile loops, for causing a relative movement of the hooks and the cutting means to cause the yarns held by the hooks to be severed by the cutting means.

20. In a loom which includes take-up means for drawing ground and pile warp yarns from a supply and weaving means for forming the warp yarns into sheds and inserting picks of filling into the sheds, the combination of a carrier extending across the warp and movable lengthwise thereof, hooks mounted movably on the carrier, means for operating the carrier and hooks in a cycle during which the carrier is moved to pass the hooks between the pile warp yarns in the shed, the hooks are moved to engage the yarns, and the carrier is moved away from the shed to cause the hooks to draw out the pile warp yarns to form loops, a knife mounted to extend across the path of travel of the hooks with the carrier, means for reciprocating the knife, means for intermittently stopping the weaving means, means operable by the stopping means for starting the means for operating the carrier and hooks through a cycle, means operable by the carrier and hook operating means at the end of each cycle for starting the weaving means, and means operable after insertion of a plurality of picks during the operation of the weaving means for causing a relative movement of the carrier and hooks and the knife to cause the knife to sever the yarns held by the hooks.

21. In a loom which includes take-up means for drawing ground and pile warp yarns from a supply and weaving means for forming the warp yarns into sheds and inserting picks of filling into the sheds, the combination of a carrier extending across the warp and movable lengthwise thereof, hooks mounted on the carrier for rotation on their axes, means for moving the carrier from a position remote from the shed toward the shed and back, the hooks passing between the pile warp yarns as the carrier moves toward the shed, means for rotating the hooks in one direction when they are between the pile warp yarns to cause the hooks to engage the yarns, the hooks drawing the yarns from the shed to form loops when the carrier returns to its original position, said rotating means rotating the hooks in the reverse direction to release the loops at the beginning of the movement of the carrier toward the shed, means for intermittently stopping the weaving means and substantially simultaneously starting the means for moving the carrier and rotating the hooks, and means operable when the carrier has returned to its original position to start the weaving means and stop the means for moving the carrier and rotating the hooks.

22. In a loom which includes take-up means for drawing ground and pile warp yarns from a supply and weaving means for forming the warp yarns into sheds and inserting picks of filling into the sheds, the combination of a carrier extending across the warp and movable lengthwise thereof, hooks mounted on the carrier for rotation on their axes, means for moving the carrier from a position remote from the shed toward the shed and back, the hooks passing between the pile warp yarns as the carrier moves toward the shed, means for rotating the hooks in one direction when they are between the pile warp yarns to cause the hooks to engage the yarns, the hooks drawing the yarns from the shed to form loops when the carrier returns to its original position, said rotating means rotating the hooks in the reverse direction to release the loops at the beginning of the movement of the carrier toward the shed, means for intermittently stopping the weaving means and substantially simultaneously starting the means for moving the carrier and rotating the hooks, means for starting the weaving means, and means operating both to stop the means for moving the carrier and rotating the hooks when the carrier has returned to its original position and to start the weaving means.

23. In a loom which includes take-up means for drawing ground and pile warp yarns from a supply, weaving means for forming the warp yarns into sheds and inserting picks of filling into the sheds, and a drive shaft for the weaving means, the combination of a carrier extending across the warp and movable lengthwise thereof, hooks mounted on the carrier for rotation on their axes, means for moving the carrier from a position remote from the shed and back, the hooks passing between the pile warp yarns as the carrier moves toward the shed and the rotating means causing the hooks to engage the yarns, so that the hooks draw out the yarns to form pile loops when the carrier returns to its initial position, and causing the hooks to release the previously formed loops, when the carrier is about to start toward the shed, a second shaft for driving the carrier moving means and the hook rotating means, means for intermittently stopping the weaving means and substantially simultaneously staring the second shaft, and means operable when the second shaft has rotated through a selected angle for stopping the second shaft and starting the weaving means.

24. In a loom which includes take-up means for drawing ground and pile warp yarns from a supply, weaving means for forming the warp yarns into sheds and inserting picks of filling into the sheds, and a drive shaft for the weaving means, the combination of a second shaft, means driven by the second shaft for engaging pile warp yarns in the shed and drawing them out to form pile loops, a one-revolution clutch for connecting the shafts, means for intermittently disconnecting the weaving means from the drive shaft to stop the weaving operation and substantially simultaneously throwing in the clutch to cause pile loops to be formed, and means operated by the second shaft near the end of each revolution thereof through the clutch to connect the weaving means to the drive shaft again.

25. In a loom, which includes means for supplying ground and pile warp yarns and weaving means for forming the warp yarns into sheds and inserting picks of filling into the sheds, the combination of means for intermittently stopping the weaving means, a carrier extending across the warp and movable lengthwise thereof, a plurality of hooks pivotally mounted on the carrier to swing parallel to the warp yarns, means brought into action substantially simultaneously with the stopping of the weaving means for moving the carrier toward the shed to pass the hooks between the pile warp yarns, swinging the hooks to cause them to engage the pile warp yarns, and moving the carrier away from the shed to draw out the pile yarns by the hooks to form pile loops, means for locking the hooks against swinging movement, means operating when the carrier has been moved to a position away from the shed for starting the weaving means again, and means for severing the pile warp yarns to release them from the hooks.

26. In a loom which includes means for supplying ground and pile warp yarns and weaving means for forming the warp yarns into sheds and inserting picks of filling into the sheds, the combination of means for intermittently stopping the weaving means, means for forming pile yarn loops including a carrier extending across the warp and movable lengthwise thereof, a plurality of hooks mounted on the carrier, and means brought into action substantially simultaneously with the stopping of the weaving means for moving the carrier toward the shed, causing the hooks to engage the pile warp yarns, and moving the carrier away from the shed to draw out the pile warp yarns by the hooks to form pile loops, means operated by the loop forming means when the carrier has been moved to a position away from the shed for starting the weaving means again, and cutting means for severing the pile warp yarns to release them from the hooks.

27. In a loom containing means for supplying pile and ground warp yarns, let-off means for the pile warp yarns, weaving means for forming the warp yarns into sheds and inserting picks of filling into the sheds, and drive means for the weaving means, the combination of a shaft, means operated by the shaft for engaging pile warp yarns in the shed, drawing out the yarns to form pile loops, and operating the let-off means for the pile warp yarns, means operating at intervals to disconnect the drive means from the weaving means and connect the drive means to the shaft to cause the shaft to be driven, means operated by the shaft for reconnecting the drive means and the weaving means, and means for disconnecting the shaft from the drive means, said disconnecting means and said reconnecting means operating when the shaft has turned through a selected angle.

28. In a loom which comprises means for supplying pile and ground warp yarns, let-off means for the pile warp yarns, weaving means for forming the warp yarns into sheds and inserting filling in the sheds, and driving means for the weaving means, the combination of means acting intermittently to stop the weaving means, means for forming pile loops by drawing pile warp yarns from the shed, said means also operating the let-off means for the pile warp yarns, means operated by the stopping means to cause the loop forming means to function, means operating automatically to stop the loop forming means when the loops of the desired length have been formed, and means operated by the loop forming means to start the weaving means in operation as the loop forming means complete their operation.

29. In a loom which includes weaving means for forming warp yarns into sheds and inserting picks of filling into the sheds, the combination of a control device, means operating through a cycle to form pile loops by drawing warp yarns from the sheds, means operated under the control of said device for substantially simultaneously stopping the weaving means and starting the loop forming means, and means actuated by the loop forming means near the end of a cycle of operation thereof for stopping the loop forming means and starting the weaving means.

30. In a loom which includes weaving means for forming warp yarns into sheds and inserting picks of filling into the sheds, the combination of a control device, means operating through a cycle to form pile loops by drawing warp yarns from the sheds, means operated under the control of said device for substantially simultaneously stopping the weaving means and starting the loop forming means, means actuated by the loop forming means near the end of a cycle of operation for stopping the loop forming means and starting the weaving means, and means functioning during the operation of the weaving means for severing pile loops that have been formed by the loop forming means.

31. In a loom which includes weaving means for forming warp yarns into sheds and inserting picks of filling into the sheds, the combination of a control device, means operating through a cycle to form pile loops by drawing warp yarns from the sheds, means operated under the control of said device for substantially simultaneously stopping the weaving means and starting the loop forming means, means actuated by the loop forming means near the end of a cycle of operation for stopping the loop forming means and starting the weaving means, and means operating under the control of said device for severing pile loops that have been formed by the loop forming means.

SAMUEL P. PARKER.